(12) United States Patent
Campbell et al.

(10) Patent No.: US 11,650,120 B2
(45) Date of Patent: May 16, 2023

(54) INTELLIGENT CABLE MODULE CALIBRATION SYSTEM AND METHOD

(71) Applicants: Richard V. Campbell, Havana, FL (US); Philip Bull, Havana, FL (US); John Wiley Horton, Tallahassee, FL (US)

(72) Inventors: Richard V. Campbell, Havana, FL (US); Philip Bull, Havana, FL (US); John Wiley Horton, Tallahassee, FL (US)

( * ) Notice: Subject to any disclaimer, the term of this patent is extended or adjusted under 35 U.S.C. 154(b) by 19 days.

(21) Appl. No.: 17/516,823

(22) Filed: Nov. 2, 2021

(65) Prior Publication Data

US 2022/0057285 A1 Feb. 24, 2022

Related U.S. Application Data

(63) Continuation-in-part of application No. 16/654,097, filed on Oct. 16, 2019, now Pat. No. 11,162,856, which is a continuation-in-part of application No. 16/255,913, filed on Jan. 24, 2019, now Pat. No. 11,162,855, which is a continuation-in-part of application No. 15/445,306, filed on Feb. 28, 2017, now Pat. No. 10,451,504.

(60) Provisional application No. 62/300,948, filed on Feb. 29, 2016, provisional application No. 62/300,948, filed on Feb. 29, 2016.

(51) Int. Cl.
*G01L 25/00* (2006.01)
*G01L 1/22* (2006.01)
*G01L 5/10* (2020.01)

(52) U.S. Cl.
CPC ............... *G01L 25/00* (2013.01); *G01L 1/22* (2013.01); *G01L 5/10* (2013.01)

(58) Field of Classification Search
CPC ... G01L 25/00; G01L 1/22; G01L 5/10; G01L 1/02; G01L 5/101
See application file for complete search history.

(56) References Cited

U.S. PATENT DOCUMENTS

| | | | | |
|---|---|---|---|---|
| 6,343,515 | B1 * | 2/2002 | Dodson | G01L 5/10 73/831 |
| 7,221,619 | B1 * | 5/2007 | George | G01V 1/201 367/16 |
| 7,478,563 | B2 * | 1/2009 | Weisman | G01L 5/042 73/833 |
| 8,267,031 | B2 * | 9/2012 | Austad | G01V 1/38 114/244 |
| 8,371,015 | B2 * | 2/2013 | Campbell | F16G 11/048 29/863 |
| 9,303,627 | B2 * | 4/2016 | Romo | G01L 5/0057 |
| 9,389,130 | B2 * | 7/2016 | Teurlay | G01L 5/103 |

(Continued)

*Primary Examiner* — Freddie Kirkland, III
(74) *Attorney, Agent, or Firm* — J. Wiley Horton

(57) ABSTRACT

A calibration process for use in calibrating intelligent cable modules. A separate calibration load cell is provided. This device is placed in the load path for the cable on which the intelligent cable module is installed. The calibration load cell then establishes a communication link with the intelligent cable module. An iterative series of loading cycles are started. Tension data as measured by the calibration load cell is used to create a calibration curve. This calibration curve is used to correlate internal measurements made by the intelligent cable module against a desired value—such as cable tension.

20 Claims, 22 Drawing Sheets

(56) References Cited

U.S. PATENT DOCUMENTS

| | | | | |
|---|---|---|---|---|
| 9,791,337 B2* | 10/2017 | Campbell | .............. | B66D 3/006 |
| 9,835,228 B2* | 12/2017 | Campbell | ............... | F16G 11/03 |
| 10,048,154 B2* | 8/2018 | Claxton | ................ | G01L 25/00 |
| 10,054,505 B2* | 8/2018 | Campbell | .............. | D07B 1/185 |
| 10,451,504 B2* | 10/2019 | Campbell | ............... | G01L 5/103 |
| 10,656,033 B2* | 5/2020 | Campbell | .............. | F16G 11/146 |
| 11,162,856 B2* | 11/2021 | Campbell | ............. | G01L 5/0004 |
| 2014/0137388 A1* | 5/2014 | Campbell | ............. | F16G 11/042 |
| | | | | 29/461 |
| 2015/0259044 A1* | 9/2015 | Amate Lopez | ......... | F03D 13/20 |
| | | | | 114/265 |
| 2015/0315743 A1* | 11/2015 | Campbell | ............... | F16B 39/20 |
| | | | | 57/310 |
| 2017/0299450 A1* | 10/2017 | Campbell | ............... | F16G 11/05 |

* cited by examiner

INTELLIGENT CABLE MODULE CALIBRATION SYSTEM AND METHOD

CROSS-REFERENCES TO RELATED APPLICATIONS

This non-provisional patent application is a continuation-in-part of U.S. patent application Ser. Nos. 16/255,913 and 16/564,097.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of tensile strength members. More specifically, the invention comprises a system and method for calibrating intelligent cable modules associated with tensile strength members.

2. Description of the Related Art

In this disclosure the over-arching term "tensile strength member" encompasses any assembly of multiple fibers or elements that is intended to carry a load primarily in tension. The term includes ropes, cables, wound slings, bridge tendons, fixed rigging, etc. The terms "rope" and "cable" are used interchangeably in this disclosure. Both are examples of a "tensile fiber strength member." Both are components that readily transmit tensile forces but not compressive forces. Tensile fiber strength members must generally be connected to other components in order to be useful. A flexible cable provides a good example. Most cables include some type of end-fitting configured to transmit a load. For example, a cable used in a hoist generally includes a lifting hook on its free end. This lifting hook may be rigged to a load. The assembly of an end-fitting and the portion of the cable to which it is attached is commonly called a "termination."

The present invention has application to many fields where tensile fiber strength members are used. A non-exhaustive listing of applicable fields includes offshore lifting, ship mooring, drag line cranes (in both fixed and moveable rigging), power shovels (in both fixed and moveable rigging), civil structure tendons (suspension bridges and the like), and floating structure moorings (such as offshore oil rigs)

Most high-strength cables are presently made of steel. Modern cables may still be made of steel, but high-strength synthetic filaments are becoming more common. The term "filament" generally refers to a component having a very small diameter. The term "fiber" is sometimes used to a component having a larger diameter. In this disclosure, however, the term "filament" and "fiber" are used synonymously. Both are tensile elements used in the construction of a larger "tensile fiber strength member."

Filaments used in modern tensile fiber strength members include DYNEEMA (ultra-high-molecular weight polyethylene), SPECTRA (ultra-high-molecular weight polyethylene), TECHNORA (processed terephhthaloyl chloride), TWARON (para-aramid), KEVLAR (para-aramid), VECTRAN (liquid crystal polymer), PBO (polybenzobisoxazole), carbon fiber, and glass fiber (among many others). Modern cables may also be made of older, lower-strength synthetic materials such as NYLON. In the case of high-strength synthetics, the individual filaments have a thickness that is less than that of human hair.

Hybrid cable designs are also emerging in which traditional materials (such as steel wires) are combined with high-strength synthetic materials. These present additional challenges, since the metal portions may be quite stiff while the synthetic portions will not be. The present invention is applicable to hybrid cable designs as well as older designs using just steel wires.

Most larger cables are made as an organized grouping of smaller cables. The smaller cables are often referred to as "strands." One example is a 12-strand cable in which the 12-strands are braided in a repeating pattern. In other examples the cable construction may be: (1) an entirely parallel construction enclosed in a jacket made of different material, (2) a helical "twist" construction, (3) a more complex construction of multiple helices, multiple braids, or some combination of helices and braids, or (4) a hybrid construction including metallic constituents.

The reader is referred to commonly-owned U.S. Pat. No. 8,371,015 for more detailed descriptions regarding the application of an attachment to a sub-component of a larger cable. The '015 patent explains how individual anchors can be attached to the strands and the anchors can then be attached to a common collector to create a uniform load-bearing structure.

The present invention is not limited to multi-stranded cables or multi-stranded terminations. Its application to multi-stranded cables is common, however, and multi-stranded cables are used in the descriptions to follow.

An intelligent cable module is a device affixed to a cable that is capable of making useful measurements—such as tension measurements. Such a module can be applied to a cable in many different locations. The preferred location is often dictated by the cable's operating environment. In order to aid the reader's understanding, several prior art operating environments will be described. The reader should bear in mind, however, that many additional non-illustrated applications exist.

FIG. 1 shows a prior art dragline crane 8. Cab 12 is mounted on walking shoes 32 that slowly move the machine from one location to the next. A turntable is provided so that the cab can swivel. Boom 14 is pivotally mounted to the cab. It extends for a large distance. For very large machines the boom may be as long as 100 meters. Mast 16 extends upward as shown. Multiple bridge support ropes 36 maintain the position of the mast and boom. A first group of bridge support ropes connects the top of mast 16 to the tip of boom 14. A second group of bridge support ropes 36 connect the top of mast 16 to A-frame 34 on the cab.

Bucket 18 actually does the digging and scooping. The weight of the bucket (and its contents) is supported by hoist rope 20. Hoist rope 20 passes over point sheave 22 and back to hoist drum 28 within the cab. Deflection sheaves 24, 26 redirect the path of the hoist rope as needed. Dragline rope pulls the bucket toward the cab. It is reeled in and paid out by dragline drum 30.

Bridge support ropes 36 are conventionally thought of as "fixed" or "standing" rigging in that they are not reeled in and paid out (in this context such a tension member will be referred to generally as a "stay"). This does not mean, however, that they are not subjected to dynamic forces. As hoist rope 20 is reeled in to lift the bucket, the tension on bridge support ropes 36 increases substantially. Once the scooping phase is done, the entire crane pivots to the dumping area. This swinging motion places lateral loads on the bridge support ropes. When the bucket is dumped the load on the bridge support ropes is suddenly and significantly reduced.

In these various motions the boom tends to bounce and sway. Bridge support ropes 36 undergo bouncing motions constantly. In some instances they will experience circular as well as lateral oscillations. The motions are best visualized as waves. Principles of superposition can produce violent motion in some instances. These violent motions are difficult to predict.

It is desirable to place intelligent cable modules in both the fixed support ropes 36 and the moving hoist rope 20 (It should be noted that there are often multiple hoist ropes). The operation of the machinery will often dictate the location of an intelligent cable module and how it is embedded within or otherwise attached to a cable.

FIG. 2 shows another type of heavy equipment that uses high strength tensile members—power shovel 40. While smaller than the largest dragline cranes, a power shovel is still quite large. A large unit will have a height of 20 meters. In the example of FIG. 2, cab 44 rests on a pair of tracks 46. A turntable allows the cab to pivot with respect to the tracks. Boom 45 is pivotally attached to cab 44. Stays 50 are a set of fixed cables that connect the upper portion of boom 45 to A-frame 34 on the cab.

Hoist ropes 20 pass over point sheave 22 and back to a drum in the cab. The hoist ropes are attached to yoke 48. The yoke lifts the forward portion of dipper 42 during each loading cycle. A pair of dipper arms 46 also support dipper 42. Each dipper arm 46 is attached to boom 45 by a pinion assembly 52. As those skilled in the art will know, pinion assembly 52 creates a rack-and-pinion engagement between each dipper arm and the boom (as opposed to a simple pivot joint). When the dipper is lifted, the rack-and-pinion engagement propels the dipper forward. The result is a combined motion where the digging teeth on the bottom lip of the dipper move forward and upward. In more recent designs the forward motion may be produced by a large hydraulic cylinder rather than a rack-and-pinion engagement.

As for the dragline crane, the fixed rigging on the power shovel is not really fixed. The stays 50 bounce and move as the machine operates. There are some problems unique to power shovels. The reader will note how the rear extreme of each dipper arm 46 passes close to a stay 50. The stays may move in a lateral wave and may also move in a circular wave (a jump rope-type motion). In extreme cases the rear of a dipper arm can collide with a stay.

Another problem known for power shovels is the fact that the dipper arms can sometimes lift the boom. This is sometimes referred to as "boom jacking." If the dipper lodges in a resistant piece of earth and stops the momentum of the stroke may pull the dipper arms forward and pivot the boom upward (with the dipper becoming a temporary fulcrum). This motion temporarily unloads stays 50. Shortly after the stays go slack the dipper will break free and the boom will fall downward until the stays are tight again. The result is a tremendous shock load. This shock load produces extreme cyclic motion in the stays. The motion will dampen over time but damage is possible in the interim.

FIG. 3 shows an elevation view of an exemplary multi-strand cable 10. This particular cable is made of individual strands 12 that are braided together—a very common construction. When tension is removed from the cable, the individual strands can be loosened to facilitate the addition of an intelligent cable module.

Although the present invention is not limited to any particular type of intelligent cable module, a limited explanation as to the nature of a few exemplary intelligent cable modules will benefit the reader's understanding. FIGS. 4-12 serve to illustrate these exemplary intelligent cable modules.

FIGS. 4-8 illustrate a first type of intelligent cable module that can be added at a desired location along a cable, or along an individual strand of a cable. FIG. 4 depicts the cable itself as a dashed line. The concept is to insert a transverse measurement element laterally through the cable strands. In the example shown a hollow transverse tube 376 is used as the transverse measurement element. The hollow tube is instrumented—such as by the inclusion of a pair of strain gauges on the inside or outside. When tension is applied to the cable, the strands squeeze the tube and the resulting change monitored by the instrumentation (such as an altered voltage drop across a strain gauge) can be correlated to the applied tension.

It is desirable to retain the transverse measurement element in a stable orientation to hold calibration and the assembly shown in FIG. 4 does this. Collar 385 is applied to the cable's exterior. A solid collar 385 can be added by sliding it over one end of the cable. If the intelligent cable module is to be added after terminations have been added to both of the cable's ends, a split collar is desirable. FIG. 4 shows an example with a split collar 385 (Note the parting seam for the two halves of the collar). The collar includes a hollow passage 386 for the cable. Hole 394 passes transversely through collar 385.

Transverse tube 376 in this example includes a hollow passage in its interior. The portion of this passage that is most distant from the viewer in FIG. 4 includes a female thread. Piercer 382 includes threaded shaft 384, which is configured to thread into the female thread in transverse tube 376. Piercer is attached to the far end of transverse tube 376. With collar 385 in place, the transverse tube and its attached piercer are carefully pushed transversely through the cable strands and out the far side of collar 384. As those skilled in the art will realize, the presence of piercer 382 greatly assists this process if the cable strands are tight. If the cable strands are able to be opened this may not be a necessary component.

FIG. 5 shows the opposite side of collar 385. Piercer 382 is unscrewed from transverse tube 376, thereby exposing the female thread of the interior of the transverse tube. The end of the transverse tube at this point lies flush within clip receiver 396. Washer 398 is placed over the threaded shaft of bolt 400 and bolt 400 is then threaded into transverse tube 376 and tightened.

Returning to FIG. 4, the reader will observe that the tightening of bolt 400 pulls orientation cap 378 tightly into cap receiver 392. Orientation cap 378 is locked in place and cannot turn. Transverse tube 376 is locked to the orientation cap so it cannot rotate either. Looking back at FIG. 5, once bolt 400 is suitably tightened retaining clip 402 is clipped in place over clip receiver 396. This produces a smooth exterior that will not tend to snag on other objects.

FIG. 6 shows a sectional view through the middle of the assembly. The cable's strands pass around transverse tube 376 (which is of course secured to collar 384). One or more strain gauges 404 are provided at suitable locations on the transverse tube. In the example shown, the strain gauges are located on the interior wall of the strain gauge.

Returning to FIG. 4, electrical leads connect the strain gauge(s) on the hollow tube to electrical contacts 380 on orientation cap 378. A corresponding set of electrical contacts is provided on the side wall of cap receiver 392 so that when orientation cap 378 is pulled into cap receiver 392, an electrical connection is made between strain gauges 404 and instrumentation package 388 located in collar 384. The instrumentation package monitors the strain measured by the strain gauges. It can communicate with external devices using antenna 390.

Although the transverse measurement element has been illustrated as having a circular cross section, many other shapes can be used. An oval or filleted diamond shape may be selected since it will tend to cause less disruption to the lay of the cable's strands. FIG. 7 shows this embodiment— where diamond tube 444 is the transverse element. The diamond tube is formed with suitable fillets at each corner. Strain gauges 404 are mounted internally. FIG. 8 sows another embodiment in which the circular tube has been plastically deformed into flattened tube 446. The flattened tube is easier to pass through some cable constructions.

The transverse measurement element may also be solid rather than hollow. In some examples the measurement element will have varying geometry down the axis. It may be oval in the center for example, yet round or square at the two distal ends. Alternatively, it may be entirely ovular. It may be one or many pieces.

FIGS. 9 and 10 show a different type of intelligent cable module. In FIG. 9 the components are shown in an exploded state. In an assembled state transition cap 284 would lie against the right side of pressure vessel 282 and transition cap 286 would lie against the left side of the pressure vessel. These embodiments are configured for installation in the center of a cable—away from the terminations on the cable's ends. The module is installed at a selected location by "upsetting" the tight lay of the strands (unweaving or unbraiding the strands when the tensile member is unloaded). The components are then inserted through one of the strand interstices into the cable's interior. The broken lines represent the "swollen" profile of cable 10 as it passes around components 282, 284, 286 installed in its interior.

Pressure vessel 282 is a hollow vessel. It can be made of metal—such as stainless steel or aluminum. It can also be made of composite materials—such as a wound fiber embedded in a resin. Transition caps 284,286 are provided to smooth the transition from the normal (undisturbed) cross-section of cable 10, over the section covering pressure vessel 282, and back to the normal cross section. Each transition cap preferably includes a concave portion configured to fit over a portion of the spherical shape of pressure vessel 282. Each transition cap also includes a tapered exterior as shown. A radial array of protrusions 288 can be provided on the exterior surface of each transition cap. These protrusions are positioned to lie within the interstices of the cable strands. They thereby inhibit the rotation of the transition caps.

FIG. 10 shows a sectional view with the components of FIG. 9 installed in the center of the cable. The reader will note how the concave end sections of transition caps 284, 286 fit around the spherical exterior of pressure vessel 282. In this example the pressure vessel is hollow and contains a Newtonian fluid 296. The Newtonian liquid selected is preferably non-corrosive. Silicone oil is one example. Pressure vessel 282 has two bosses 298, 300 that are intended to be positioned along the cable's central axis as shown. Boss 300 includes a threaded hole. Pressure transducer 290 is threaded into this hole and secured in place. In this example, instrument package 292 is made integral with pressure transducer 290. Antenna 294 may be made as part of the housing for instrument package 292 or may extend externally as shown. Instrument package 292 preferably includes a radio transceiver that is able to send and receive data via antenna 294.

The cable's strands pass smoothly around pressure vessel 282. When tension is applied to the cable, the strands encompassing the pressure vessel apply an external squeezing force. This squeezing force produces an internal pressure rise that is monitored by pressure transducer 290. Pressure vessel 282 is given a shape so that the squeezing force exerted by tension on the cable will produce a pressure rise in the fluid contained within the pressure vessel. The example shown is a sphere. As those skilled in the art will know, a sphere represents the minimum surface area for a given volume of fluid contained therein. Tension on the cable tends to squeeze the sphere so that the cross section of the pressure vessel 282 in FIG. 10 becomes more elliptical. The departure from the spherical shape produces a decrease in the internal volume and a resulting rise in internal pressure.

In the example of FIG. 10, a Newtonian liquid is used to completely fill pressure vessel 282. Those skilled in the art will know that the density of a Newtonian liquid increases only slightly with increasing pressure. Thus, even a slight compression in the shape of pressure vessel 282 will produce a significant change in the internal pressure read by pressure transducer 292.

FIGS. 11 and 12 illustrate yet another type of intelligent cable module—this one using a transverse tube without a surrounding collar. Transverse tube 376 is again a hollow tube containing strain gauges. Instrument housing 406 contains the strain gauge monitoring instruments, a power supply, and communication hardware. The instrument housing is elongated as shown. Two transverse channels 408, 410 are provided in the instrument housing. Piercer 382 is threaded into place and described previously. Transverse tube 376 is then carefully pushed through the center of the strands of cable 10 (a removable fixture may be used to ensure the proper alignment). Piercer 382 is then removed. Bracket 412—which also includes a pair of channels—is attached to the far side of transverse tube 376 by threading bolt 400 through hole 413 and into the threaded receiver in transverse tube 376.

FIG. 12 shows the installed configuration. Bands 414 are passed around the assembly and tightened. The bands lie within channels 408, 410. Instrument housing 406 cannot turn and tube 376—which is locked to the instrument housing—cannot turn. A protective sheath can be applied over the assembly shown in FIG. 21. The result is an intelligent cable module that can be added in any desired position along a cable at any time.

All these intelligent cable modules contain a tension proxy measurement device. The term "tension proxy measurement" means a measurement that can be made of a value that is related to the tension applied to the cable. For the example of FIGS. 4 and 5, the tension proxy measurement is the measurement of the voltage drop across the strain gauges placed in the transverse hollow tube. The value for the voltage drop can be correlated to the tension applied on the cable and—once a good correlation is established—the values obtained for the voltage drop across the strain gauges can easily be converted into values for applied tension.

In the exemplary intelligent cable module depicted in FIGS. 7 and 8, the tension proxy measurement is a measurement of the pressure inside the sphere being compressed by tension in the cable. This value can also be correlated to applied cable tension and—once a good correlation is established—the values obtained for the pressure inside the sphere can be easily converted into values for applied tension.

An intelligent cable module can be placed in a virtually endless variety of locations, including an intermediate point along a cable, within a termination on an end of a cable, or within the cable but near a termination. FIGS. 13-15 provide a small sample of these exemplary locations. FIG. 13 shows the placement of multiple intelligent cable modules 202 on a dragline crane 8. One module 202 is placed on the portion of hoist rope 20 lying below point sheave 22. This module serves well to illustrate typical placement concerns. The module is mounted high enough to avoid the dust and flying debris in the vicinity of bucket 18. It is mounted low enough so that it remains well below point sheave 22 in the normal operation (The intelligent cable module would likely be damaged it is passed over the point sheave).

A second intelligent cable module 202 is placed on hoist rope 20 in between deflection sheave 24 and point sheave 22. This module remains approximately mid span and is well positioned to measure and transmit cyclic tension loads on the hoist rope. Several other intelligent cable modules 202 are placed at intermediate points along the bridge support ropes 36.

In this example the intelligent cable modules are battery powered. They store data internally and burst transmit the data, a subset of the data, or a summary of the data periodically. The modules are preferably able to for a wireless network so that information from one module can be passed along by another module. A collection system can be located in cab 12 or some other convenient location. The use of a wireless network allows more reliable communication, particular for modules that are far from the data collection system.

FIG. 14 shows an exemplary installation of intelligent cable modules 202 on a prior art power shovel 40. A module is placed on each of the two boom stays 50. A module is also placed on hoist rope 20. The hoist rope on this power shovel is in a "block-and-tackle" form where a single rope passes over sheaves on the end of the boom and on the yoke assembly (which is attached to dipper 42). The module 202 on the hoist rope is mounted fairly low so that it will still remain below the boom sheaves when the dipper is raised.

FIG. 15 shows an exemplary installation of intelligent cable modules 202 on a set of mooring lines 244 connecting a vessel to quay 252. The modules in this example are placed on the mooring lines outside the hawser holes in the vessel and well away from the bollard 242. This placement keeps the modules free of contact with hard metal surfaces. On the other hand, the modules in this application must be made fairly tough because they will likely be pulled inboard through the hawser holes. The formation of a module network can be particularly effective in this scenario, as the steel hull of the vessel often impedes the radio transmission of data from some of the modules.

The relationship between the value measured by a strain gauge, pressure transducer, or other measurement device in an intelligent cable module and the tension applied to the cable is quite complex for a typical multi-stranded cable construction. Thus, it is difficult to develop a mathematical expression that relates the tension proxy measurement to applied tension. This is not to say that it is impossible to develop such a relationship. However, variations from cable to cable make the uncertainty in using such a defined relationship so large that it is not practical. A more practical solution is to calibrate cable tension versus a measured value for a particular cable design, and more preferably even for a particular cable. The present invention provides just such a calibration process.

BRIEF SUMMARY OF THE PRESENT INVENTION

The present invention comprises a calibration process for use in calibrating intelligent cable modules. A separate calibration load cell is provided. This device is placed in the load path for the cable on which the intelligent cable module is installed. The calibration load cell then establishes a communication link with the intelligent cable module. An iterative series of loading cycles are started. Tension data as measured by the calibration load cell is used to create a calibration curve. This calibration curve is used to correlate internal measurements made by the intelligent cable module against a desired value—such as cable tension.

Figure 1:
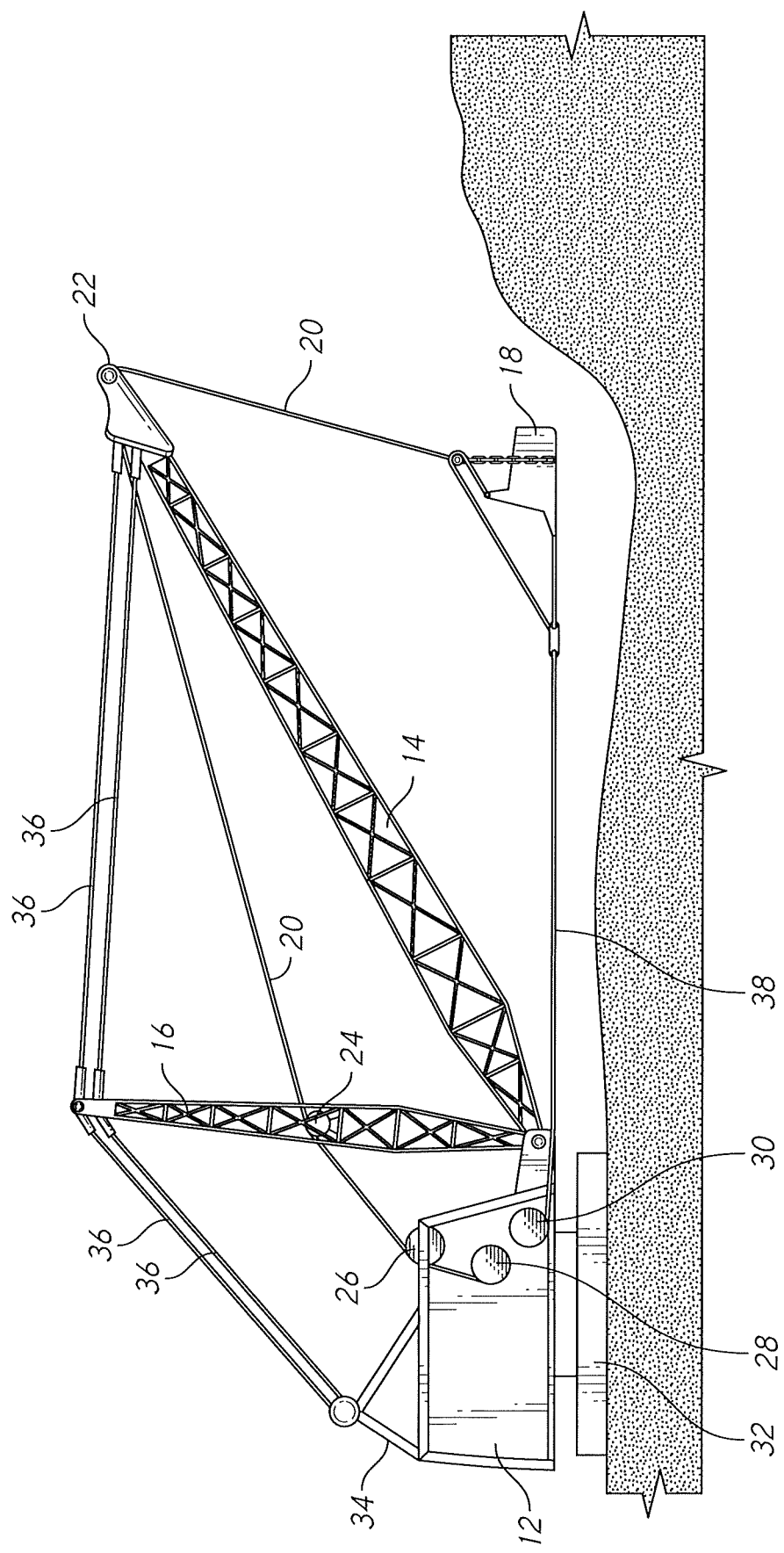
FIG. 1 is an elevation view, showing a prior art dragline crane.
Figure 2:
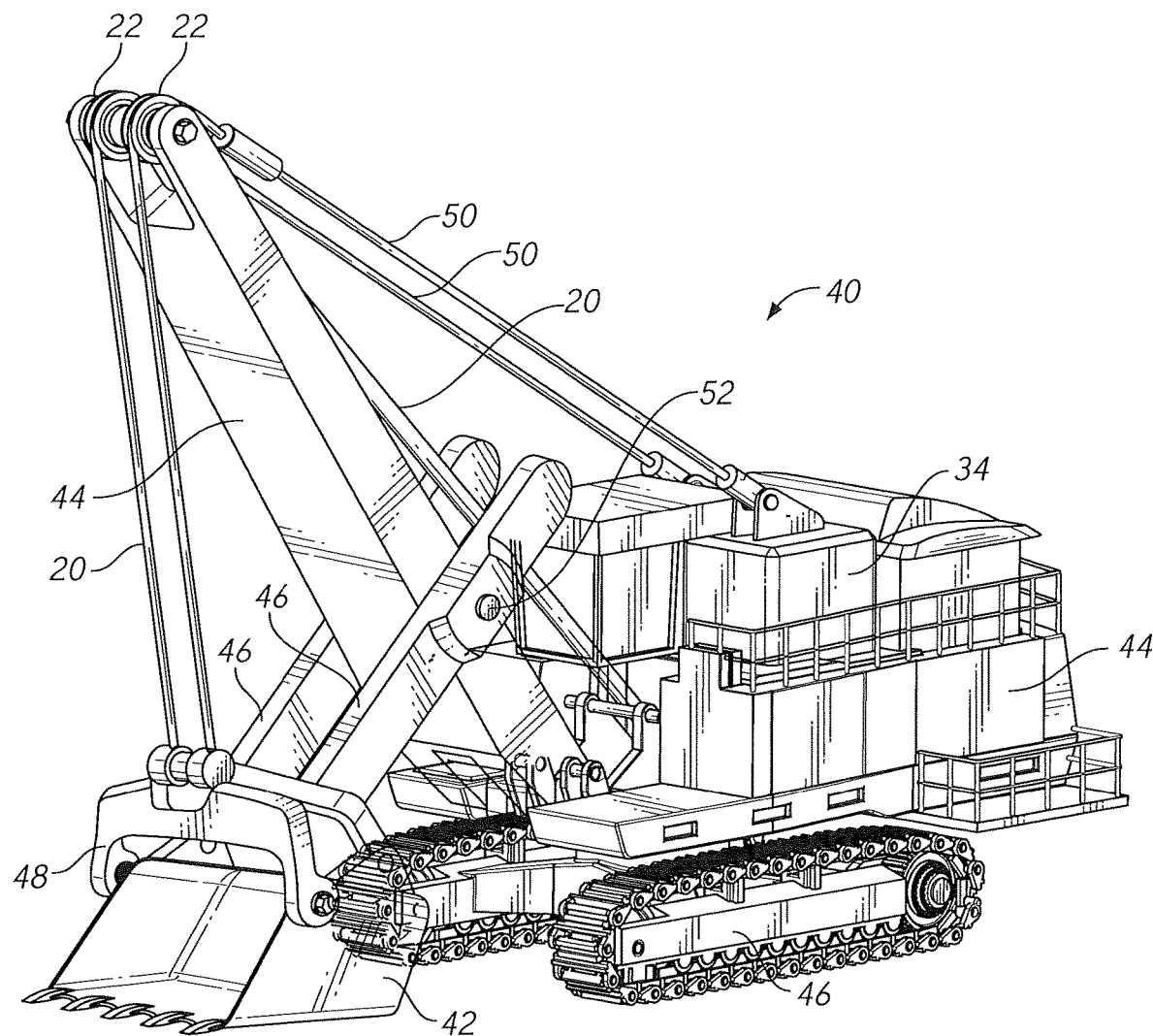
FIG. 2 is a perspective view, showing a prior art power shovel.
Figure 3:
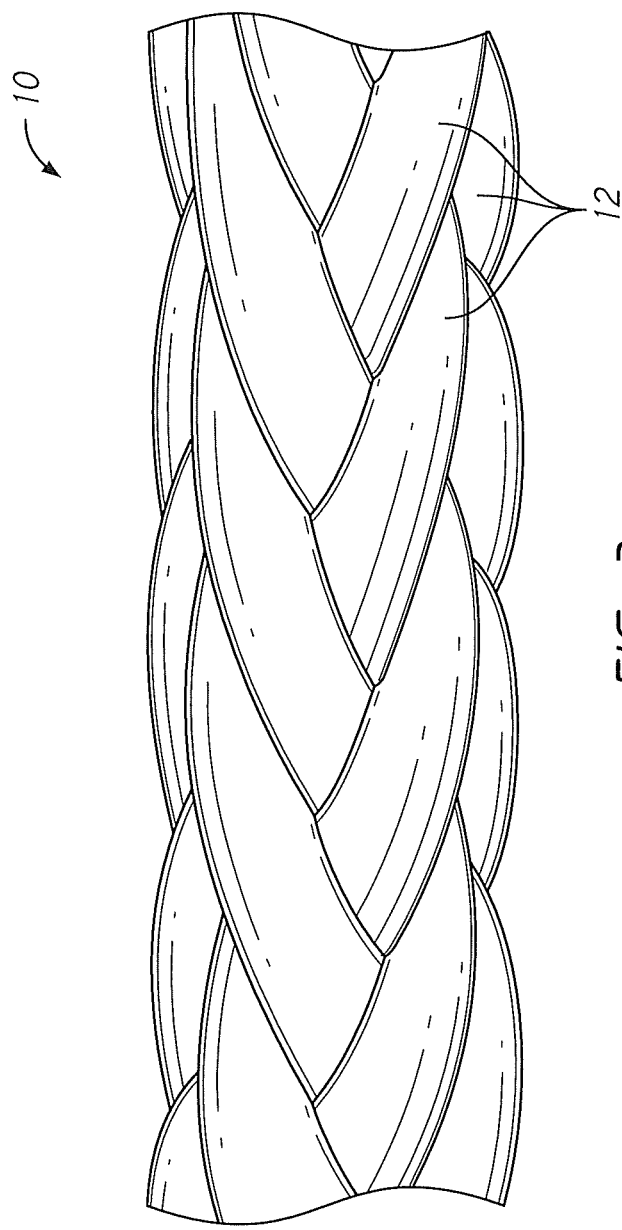
FIG. 3 is an elevation view, showing a prior art stranded cable.

REFERENCE NUMERALS IN THE DRAWINGS 8 dragline crane
10 cable
12 cab
14 boom
15 strand
16 mast
18 bucket
20 hoist rope
22 point sheave
24 deflection sheave
26 deflection sheave
28 hoist drum
30 dragline drum
32 shoe
34 A-frame
36 bridge support rope
38 dragline rope
40 power shovel
42 dipper
44 cab
45 boom
46 track
48 yoke
50 stay
52 pinion assembly
54 termination
202 intelligent cable module
240 vessel
242 bollard
244 mooring line
246 sling
250 mooring stay
252 quay
254 winch
282 pressure vessel
284 transition cap
286 transition cap
288 protrusion
290 pressure transducer
292 instrumentation package
294 antenna
296 Newtonian fluid
298 boss
300 boss
376 transverse tube
378 orientation cap
380 electrical contact
382 piercer
384 threaded shaft
385 collar
386 hollow passage
388 instrumentation package
390 antenna
392 cap receiver
396 clip receiver
398 washer
400 bolt
402 retainer clip
404 strain gauge
406 instrumentation housing
408 channel
410 channel
412 bracket
413 hole
414 band
444 diamond tube
446 flattened tube
448 shackle
450 calibration load cell
452 shackle
454 rigid mount
456 sling
458 processor
460 strain gauge controller
462 strain gauge array
464 memory
466 communication module
468 antenna
470 data port
472 charging port
474 processor
476 communication module
478 antenna
480 strain gauge controller
482 memory
484 strain gauge array
486 data port
488 charging port
494 winch controller
496 memory
498 RF module
500 power button
502 initiate button
504 indicator
506 indicator
508 smartphone
510 GUI
512 indicator
514 initiate step
516 comm request step
518 comm received step
520 authentication step
522 link transmit step
524 authentication step
526 comm linked step
528 load cycle commencement step
530 transmit tension step
532 sample strain gauge step
534 store sample step
536 load cycle completion query
538 build calibration curve step
540 calibration stability query
542 completion step
544 calibration end step

DETAILED DESCRIPTION OF THE INVENTION

The present invention can be used with virtually any type of intelligent cable module. Additional examples of these modules are provided in the parent application—U.S. patent application Ser. No. 16/564,097. U.S. application Ser. No. 16/564,097 is hereby incorporated by reference.

The present invention presents a calibration process whereby a particular intelligent cable module on a particular cable can be calibrated so that it can convert its internal measurements into a derived value that is useful for monitoring the cable. The most common derived value will be applied tension. The inventive calibration process produces a calibration curve relating the intelligent cable module's internal measurements (such as the tension proxy measurements) to the derived value (such as cable tension). In this disclosure the term "calibration curve" is to be understood broadly to mean any method of storing a relationship between internal measurements made by an intelligent cable module and a derived value. The "calibration curve" can assume the form of a mathematical function, a look-up table, a look-up table with interpolation, or any other suitable form.

Figure 4:
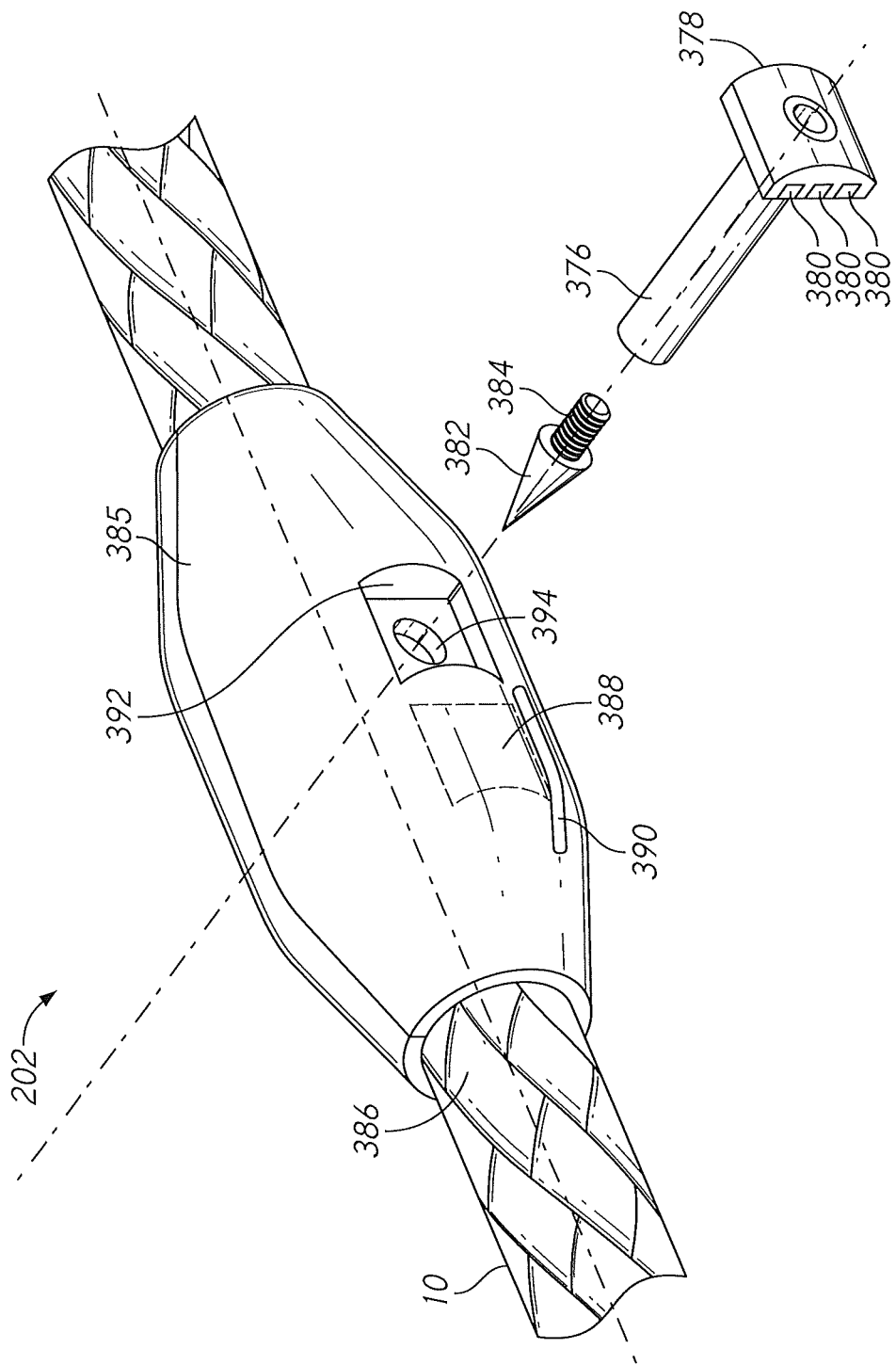
FIG. 4 is an exploded perspective view, showing an intelligent cable module such as used in the present invention.

An example will be described using the intelligent cable module 202 of FIG. 4. Once this module is installed on the cable, tension applied to the cable will squeeze transverse tube 376. The strain gauges attached to transverse tube 376 respond to this squeezing force. Thus, the internal measurement made by the intelligent cable module is a voltage drop across a strain gauge array (the tension proxy measurement). An external device is used to measure the applied tension (typically a calibrated load cell).

Figure 16:
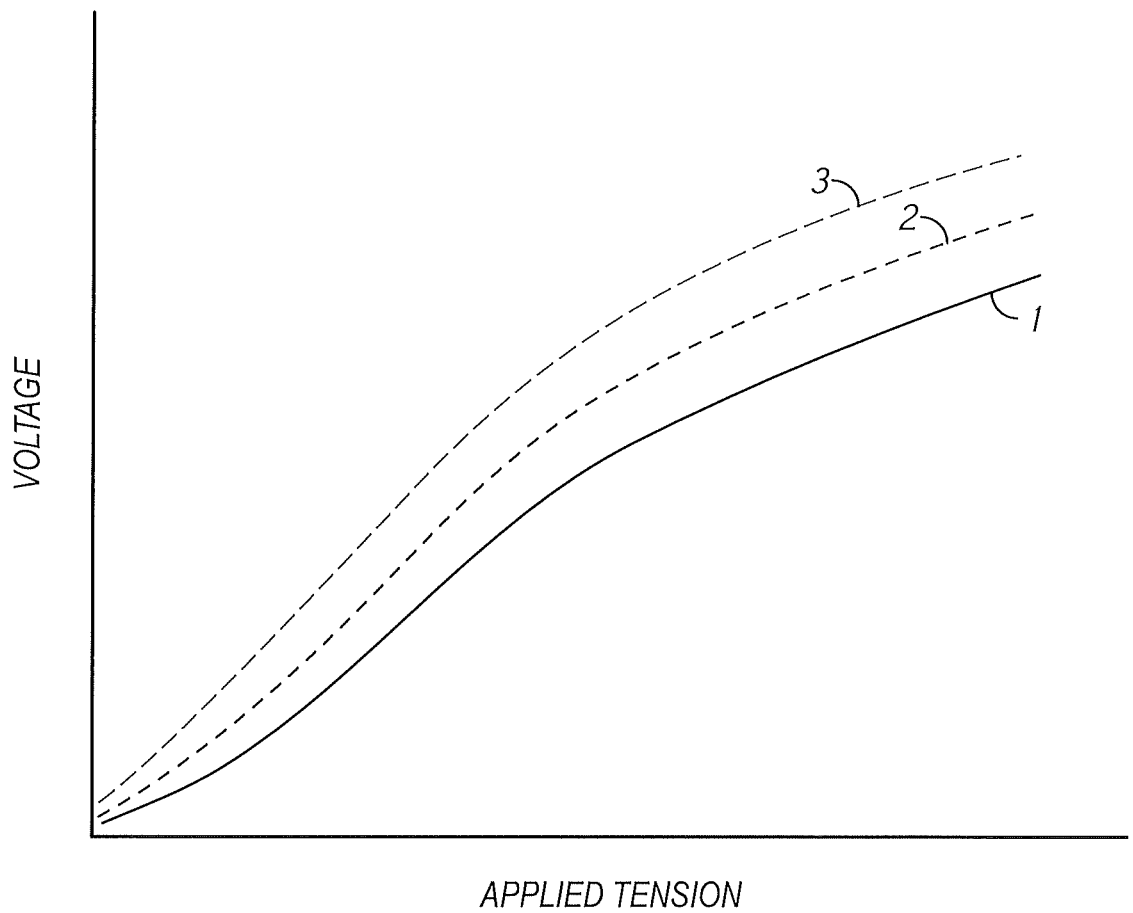
FIG. 16 is a plot of a calibration curve for an intelligent cable module.

FIG. 16 shows an exemplary plot of applied tension (on the X-axis) versus measured strain gauge voltage (on the Y-axis). Of course—as discussed previously—the calibration of all these different types of intelligent cable modules (as well as other types) is important to their use. Without calibration, the values produced by the on-board strain measurements are essentially meaningless. The calibration process for many cable geometries will not be simple. A multi-stranded synthetic cable does not behave as predictably as a wire rope. After terminations are added, the synthetic cable should be "bedded" by subjecting it to a significant tension schedule. This bedding process seats the fibers in a more final and compact form. During this process the cable geometry changes slightly as the strands slide over each other. In some instances, it is necessary to adjust the individual length of each terminated strand. Otherwise, the load distribution among the strands may become uneven. In some cases it is necessary to undergo a first bedding process, then re-adjust the strand lengths, then undergo a second bedding process. It is advisable to bed the cable properly before proceeding to the calibration process for the intelligent cable modules. Otherwise, the calibration may not be accurate.

FIG. 16 actually shows a hazard of calibrating an intelligent cable module without properly bedding the cable to which it is attached. Three identical tension cycles are applied in which the tension is increased at a set rate over time. The reader will note that the three curves are not consistent. Curve 3 (the third iteration) has a greater slope than curves 1 and 2. This indicates that the cable is still bedding and has not yet stabilized.

Even when proper pre-bedding is performed, calibration is often an iterative process. This is because the insertion of the intelligent cable module itself upsets the cable geometry somewhat. Looking again at the example of FIG. 4, the reader will note that transverse tube 376 is relatively small in relation to the cable. Even so, it upsets the lay of the cable strands when it is passed transversely through the cable. In such a case several tension cycles may be needed to stabilize its position.

Figure 17:
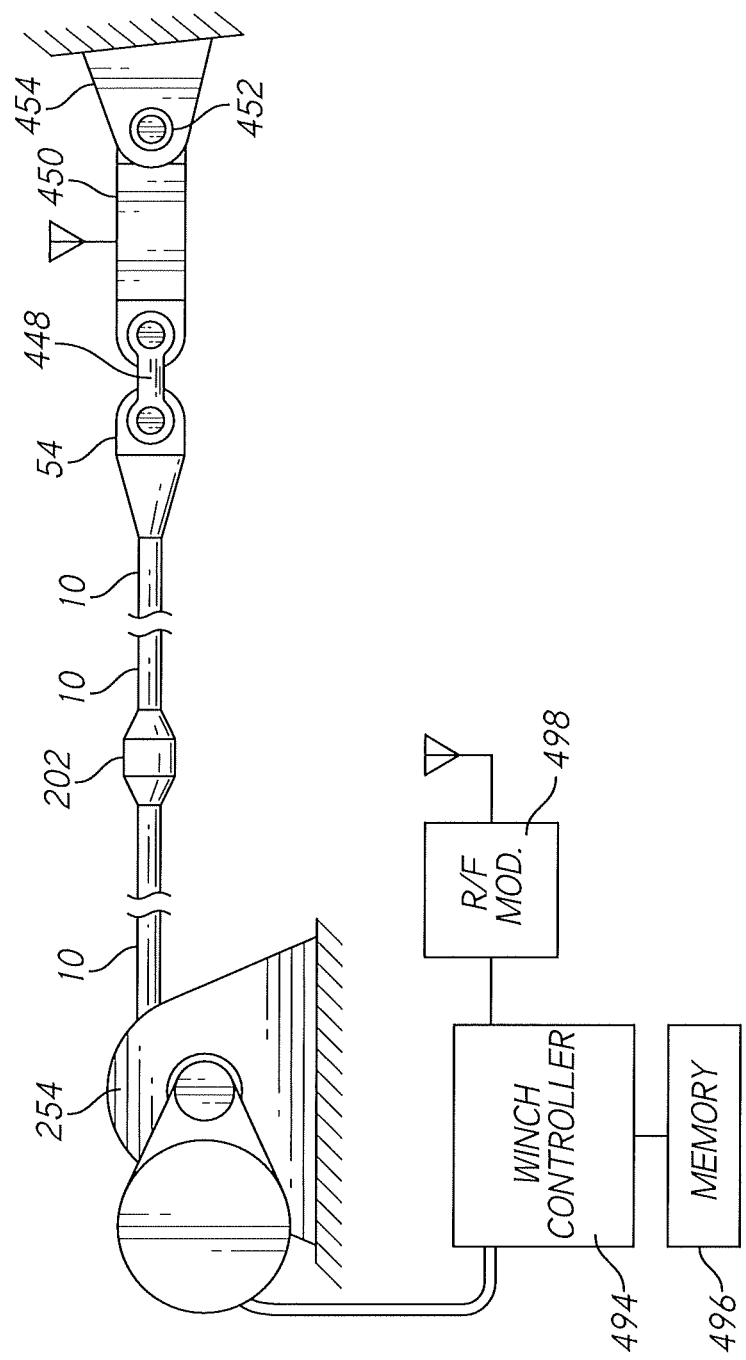
FIG. 17 is an elevation view, showing an exemplary arrangement used for calibration.

Before turning to a more detailed description of the calibration methodologies, a physical description of how calibration is carried out will be provided. FIG. 17 depicts a first exemplary arrangement for applying tension and calibrating a cable. Winch 254 is affixed to a strong anchoring structure. Cable 10 is spooled on the winch drum. The winch drum is driven by a powerful electric or hydraulic motor in order to apply tension to the cable.

Calibration load cell 450 has a loading eye on each of its two ends. The load cell includes a linear force measurement cell which can accurately measure and record the tensile load existing between its first and second loading eyes. In this example the load cell also has a radio communication module that can transmit the current load to an external control system.

Intelligent cable module 202 is affixed to the cable. Termination 54 is affixed to the free end of the cable. The termination includes a large loading eye. Shackle 448 connects termination 54 to a first end of calibration load cell 450. Shackle 452 connects the second end of the load cell to fixed mount 454. Thus, the calibration load cell is rigged to very accurately measure the tension applied to itself, which is the same as the tension applied to the cable.

Winch 254 is used to add tension to cable 10 in a controlled manner. A closed-loop control system may be used. In the example shown winch controller 494 controls the tension added by winch 254. Memory 496 associated with the winch controller stores a software program created to carry out the calibration process. RF module 498 is also linked to winch controller 494. The RF module in this example is in communication with an RF module in calibration load cell 450. The calibration load cell provides real-time tension readings to winch controller 494.

The winch controller uses the real-time tension readings to implement a closed-loop control system for the winch drive. The controller "ramps up" the tension according to a desired schedule to calibrate intelligent cable module 202. At all times the calibration load cell is making a set of measurements of the tension applied.

The rig shown in FIG. 17 allows the verification of the calibration process in the following way. As the reader will recall, intelligent cable module 202 is preferably configured to provide wireless communication. It can also be linked to RF module 498. The reader will recall that the internal readings for the intelligent cable module do not initially correspond to applied tension on the cable. They are typically just a measured voltage drop across a strain gauge array (or a pressure for an internal sphere or some other useful value). The calibration process correlates the internal readings against the actual tension on the cable as accurately measured by calibration load cell 450. Once calibrated, the cable module's internal readings are readily converted to values for cable tension or other useful parameters. The preferred approach is to have the cable module 202 itself convert its internal measurements into an equivalent tension. Once calibrated and in operation the cable module stores and/or transmits values for the tension on the cable.

Of course, as is known in the art, load cell 450 is already carefully calibrated and it directly transmits cable tension values. Winch controller 494 can therefore receive tension readings from both calibration load cell 450 and intelligent cable module 202. Once the bedding processes are complete, these two values for tension should correspond. In fact, once the cable module is properly installed and calibrated, the two values should correspond very closely. Once this correspondence is seen, the operator can be confident that the intelligent cable module has been well calibrated and that the calibration curve created is ready for use.

The arrangement of FIG. 17 is one that can be used to recalibrate an existing cable or to initially calibrate a newly-manufactured cable. An exemplary process for a new cable is as follows:

1. The cable assembly itself is bedded by applying a series of pulls. This is done before the intelligent cable module is added. The same rig as shown in FIG. 17 can be used (but without module 202). The bedding process proceeds to stretch and seat all the cable components until they are stable (including any terminations added to an end of the cable).

Stability can be determined in a variety of ways. A common way is to measure the overall length of the cable assembly—when it stops elongating the assembly is deemed stable.

2. The intelligent cable module 202 is added to the assembly.

3. The calibration process for intelligent cable module 202 is performed by subjecting the assembly to additional loading cycles. An initial calibration curve is stored in the module 202 so that the module can produce values for cable tension at the same time calibration load cell 450 produces values for cable tension.

4. Additional loading cycles are applied to the cable assembly and new calibration curves are created for each cycle. The tension values produced by the intelligent cable module 202 (using the most recent calibration curve) will tend to more closely match those produced by calibration load cell 450 over time. Eventually, the values produced by the application of the calibration curve in the intelligent cable module will match those produced by the calibration load cell (The term "match" here will generally mean within some specified tolerance, such as 5% or 1%).

Following this calibration process the cable assembly can be released for service in the field. The intelligent cable module can provide useful values for many months of service, and in some instances even longer intervals. However, the calibration curve loaded in the intelligent cable module 202 is unlikely to remain valid indefinitely. A recalibration will need to be performed for each intelligent cable module from time to time. Reasons for recalibration include the following:

1. Cable assemblies—particularly those made of synthetic filaments—do change over time. Strand-to-strand slippage accounts for some of the change. The breakage of individual synthetic filaments also occurs over time and this phenomenon causes changes as well. These and other phenomena can diminish the accuracy of the calibration curve even where the module's installation has not been disturbed.

2. Cable assemblies must sometimes be removed to permit inspection. In some cases the intelligent cable module must be removed from the cable as part of the inspection process—such as when the length of cable containing the module must be pulled over a sheave. Even when a module is reinstalled in the same position on the same cable, recalibration is advisable.

3. In some cases a cable will need to be replaced but the intelligent cable modules on that cable are still providing good service. Even where a module is placed on an identical cable recalibration is advisable.

4. In some cases an intelligent cable module will be removed from one cable and installed on a completely different type of cable (perhaps even in a very different application). Recalibration in this instance will obviously be required.

Figure 22:
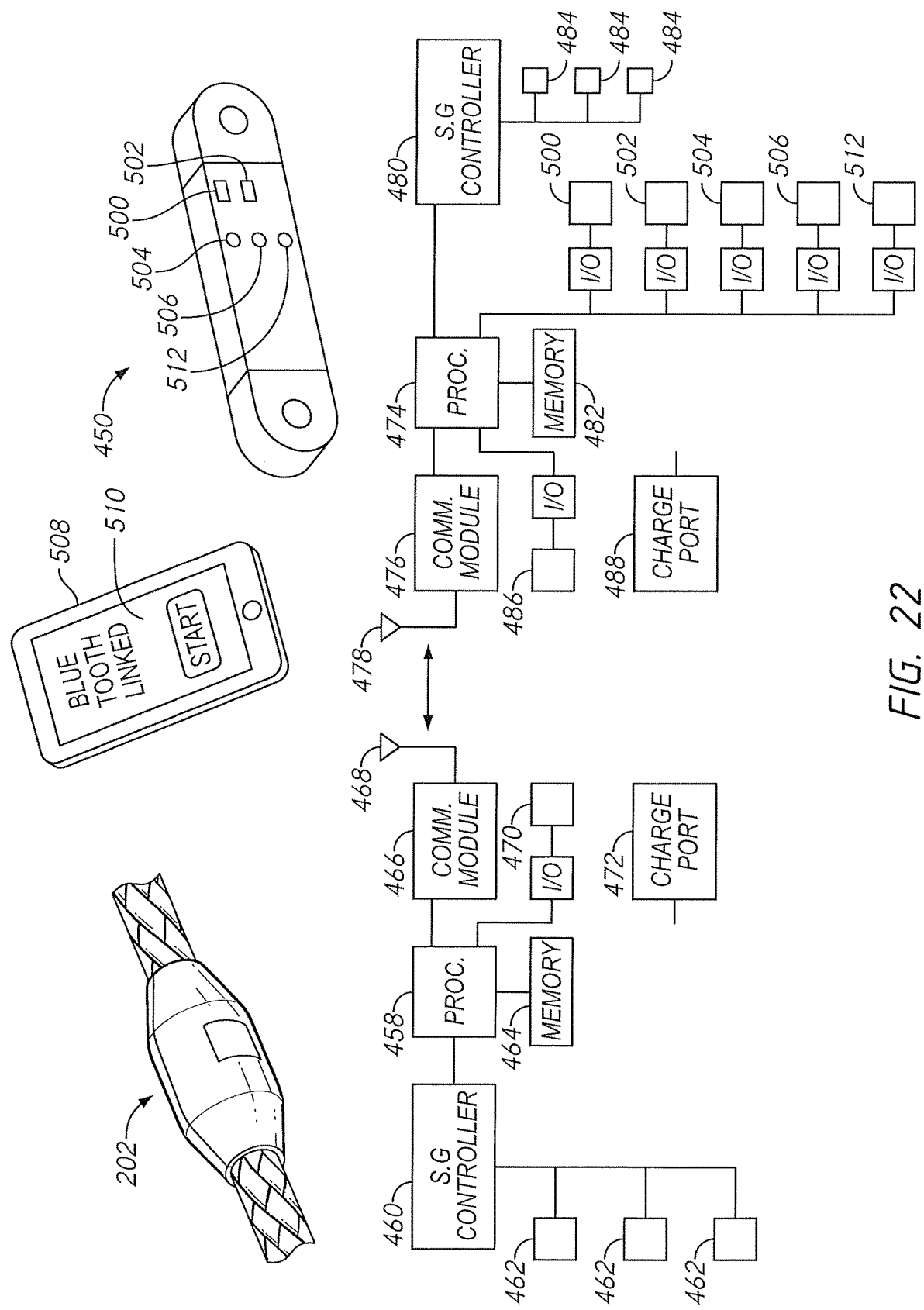
FIG. 22 is a block diagram, showing the components used in the calibration process.

Recalibration is preferably an operation that can be carried out in the field. The present inventive method and system can be used in the field in many applications. FIG. 22 depicts exemplary hardware used to carry out field calibration or initial calibration. An intelligent cable module 202 installed on a cable 10 is shown on the left side of the view. The internal electronic components of the intelligent cable module are depicted in block diagram form just below the depiction of the intelligent cable module. These components are containing in instrumentation package 388 of the module embodiment shown in FIG. 4 (except for the strain gauge array and the antenna).

Processor 458 runs software retrieved from associated memory 464 to carry out the desired operations. Strain gauge controller 460 provides regulated voltage to strain gauge array 462—the strain gauge array being the actual measurement component. The strain gauge controller also monitors the voltage across the strain gauge array and converts the measured value to a measured strain. A value for measured strain is then sent from strain gauge controller 460 to processor 458. As those skilled in the art will know, strain gauge controllers now customarily contain an analog-to-digital converter. The output of the strain gauge controller is usually a numerical value (such as 0 to 255) rather than a voltage. Processor 458 retrieves and uses the value from strain gauge controller 458.

Communication module 466 is configured to send and receive wireless messages via antenna 468. The communication module can transmit data to an outside receiver and can receive data from an outside transmitter. The communication module sends information to processor 458 and receives information from processor 458.

In this example, the communication module is connected to an I/O port on processor 458. Additional I/O ports can be provided. For instance, data port 470 can be provided so that an external device can be connected to processor 458 via a physical jack (a hardwired connection). Electrical power for the intelligent cable module is often supplied via an internal battery. This battery may need recharging from time to time. Charge port 472 is provided for this purpose.

Exemplary internal electronic components for calibration load cell 450 are shown on the right side of the view—below the depiction of the calibration load cell itself. In this example the internal components are similar to those of the intelligent cable module. Processor 474 runs software retrieved from associated memory 482 to carry out the desired operations. Strain gauge controller 480 provides regulated voltage to strain gauge array 484. The strain gauge controller also monitors the voltage across the strain gauge array and converts the measured value to a measured strain. A value for measured strain is then sent from strain gauge controller 480 to processor 474.

Calibration load cell 450 includes internal components that are known in the field of prior art load cells. As is typical, the calibration load cell includes an internal "neck" that is subjected to the entire tensile load. This neck is precisely made so that it has fixed and known dimensions. The material used for the neck region is selected to provide a suitable stress/strain relationship (Young's modulus), to provide suitable corrosion resistance, etc. The strain gauge or gauges are placed in this neck region. Temperature compensation is provided so that the strain values obtained from the strain gauges can vey precisely be converted into applied tension by strain gauge controller 480. This value is sent to processor 474.

Communication module 476 is configured to send and receive wireless messages via antenna 478. The communication module can transmit data to an outside receiver and can receive data from an outside transmitter. The communication module sends information to processor 474 and receives information from processor 474.

In this example, the communication module is connected to an I/O port on processor 474. The processor is provided with additional I/O ports so that data can be exchanged via a hardwired data port 486. A charge port 488 is also provided so that the internal battery provided power to the electronics can be recharged.

The exemplary calibration load cell 450 also includes physical buttons and indicators. The buttons are preferably provided on a weatherproof membrane switch and the indicators preferably shine through a protective membrane as well. A user presses power button 500 to power up the calibration load cell. Indicator 504 illuminates when power is switched on and remains illuminated until a user powers down the device by again pressing power button 500.

Initiate button 502 is pressed to initiate the calibration cycle. Indicator 506 illuminates when a calibration cycle has been initiated. Indicator 512 illuminates when the calibration process has been complete. With the components being thus understood, some exemplary calibration rigs will be described.

Figure 18:
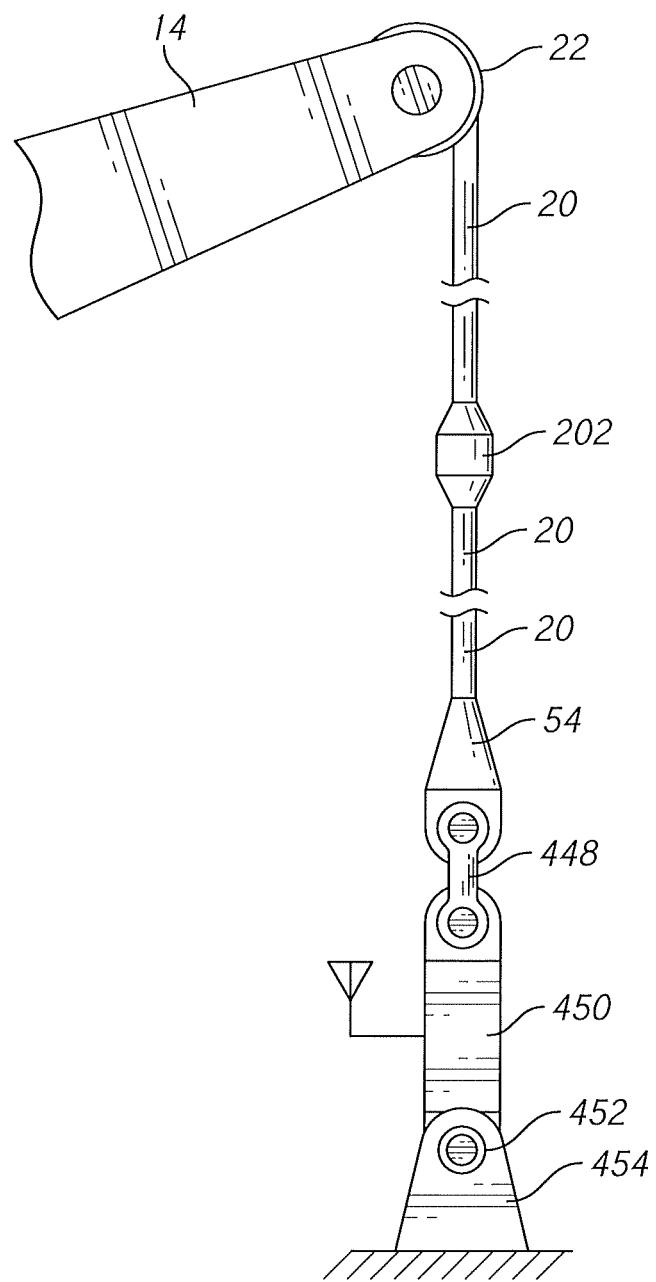
FIG. 18 is an elevation view, showing an exemplary arrangement used for calibration.

FIG. 18 shows a calibration rig that can be used for a hoist rope on a crane. Hoist rope 20 passes over point sheave 22 on boom 14. Termination 54 lies on the end of hoist rope 202. Intelligent cable module 202 has been previously installed on the hoist rope—between point sheave 22 and termination 54. In the crane's normal operating cycle, a lifting hook is attached to the loading eye on the lower end of termination 54. The particular cable module 202 is scheduled for recalibration once every 8,000 lifting cycles. Calibration cycle monitoring is part of the operation of the processor within module 202. The processor monitors the applied cable tension and counts the number of lifting cycles that exceed a minimum threshold. Once the number of cycles has been exceeded, module 202 transmits a message indicating that recalibration is needed. Alternatively, a flashing indicator can be provided on module 202 and this indicator can be activated to inform the user of the need for calibration.

In order to perform the recalibration, calibration load cell 450 is taken to the worksite. In this example the lifting hook is removed from termination 54 and a shackle 448 is used to link the termination to a first loading eye on calibration load cell 450. A second shackle 452 is used to link a second loading eye on the calibration load cell to rigid mount 454. The rigid mount can be a loading eye attached to a very heavy object or even a loading eye attached to a large ground anchor.

Once the rig is complete and the crane operator is ready to apply tension to the hoist rope, the user turns on calibration load cell 450 and initiates the calibration cycle (such as by pressing the power button and pressing the initiate button on the load cell, but optionally by wireless communication with the load cell). Returning to FIG. 22, load cell 450 wirelessly links itself to intelligent cable module 202. This linking can be done using any suitable communication protocol, but is preferably done using encrypted two-way communication. As an example, the calibration load cell and the intelligent cable module can be linked using the BLUETOOTH protocol promulgated by the Bluetooth Special Interest Group of Kirkland, Wash., U.S.A.

Once the communication link is made, processor 474 causes indicator 506 to blink. This indicates that the calibration process is ready to commence and the operator should begin applying a load to the cable. The operator will be given general guidance as to the type of load cycle needed. However, this is not necessarily a closed-loop system where real-time tension information from the calibration load cell is used to drive the machinery applying the load (such as the hoist rope drum drive). Rather, as one example, the operator is told simply to ramp up the applied tension into the upper range of a normal working load and to repeat the cycle until calibration load cell 450 indicates that the calibration is complete.

The operator thus operates the controls to reel in hoist rope 20. After the hoist rope draws taut the operator increases the tension and then decreases the tension back to zero. The operator repeats the increase and decrease cycle.

During each cycle, processor 474 within calibration load cell 450 is communicating with processor 458 on board intelligent cable module 202. The two processors store data on a common time frame so that data produced by one device can be actually compared with data produced by the other device. In this example the two devices 202, 450 actually sample the strain gauge readings at the same point in time and at the same sample rate—such as once every 50 milliseconds.

Processor 458 collects readings produced by strain gauge array 462 and stores these with an associated time. Processor 474 also records accurate tension values and stores these with an associated time. In this example, the actual tension values are transmitted from calibration load cell 450 to intelligent cable module 202. During or after the first load cycle, processor 458 builds a first calibration curve relating readings from its associated strain gauge array 462 to actual tension values measured by the calibration load cell. This first calibration curve is stored in memory 464.

During the second load cycle, the calibration load cell again measures actual tension and transmits these values to the intelligent cable module 202. The intelligent cable module uses these values to create a second calibration curve. At the end of the second load cycle, the intelligent cable module compares the second calibration curve to the first calibration curve and notes the change in between. The load cycle is repeated until the calibration curve stabilizes and stops changing significantly.

As an example of the stabilization criterion, software running on processor 458 could use the most recent calibration curve to calculate the applied tension based on the measurement made by strain gauge array 462. The same software could then compare the calculated tension value against the actual tension measured by calibration load cell 450. When this comparison produces a maximum difference that is less than 2%, the calibration process is deemed complete.

Processor 474 then causes indicator 512 to illuminate and remain on—indicating the completion of the process. Thus completed, the final calibration curve is locked into memory 404 with the intelligent cable module—along with the date and time of calibration. Tension is removed and the calibration load cell is removed and replaced with the loading hook customarily used on the crane. The crane is returned to service.

It will often be convenient to use a separate monitoring and control device in this process. FIG. 22 depicts an exemplary monitoring and control device—smartphone 508. Smartphone 508 includes a powerful internal processor and extensive memory. It stores software configured to carry out the calibration process. The software presents a menu-based graphical user interface 510 to the user. Once the calibration load cell 450 is in place and turned on, smartphone 508 can be paired with the calibration load cell—such as by using the BLUETOOTH communication protocol discussed previously. The smartphone then carries out two-way wireless communications with the calibration load cell.

As those skilled in the art will know, the smartphone can present layered menus and various user inputs (such as touch buttons, sliders, etc.). These inputs can be used to control the calibration process rather than the physical buttons on the calibration load cell. The presence of the calibration load cell is the key in this example to opening and operating the smartphone software application ("app").

The app can display numerous useful things on the GUI. As an example, the app can provide a graphical depiction of a desired range of loads to be used during the calibration process. In the example of a lifting crane, smartphone 508 can be viewed by the crane operator as the load is being applied. Real-time tension data is fed from calibration load cell 450 to the smartphone (as well as the intelligent cable module). This real-time data can be shown on the GUI— such as a moving needle mimicking an analog gauge. Alternatively, the GUI could display a large up arrow to instruct the operator to increase tension. This would be followed by a green light and a down arrow to indicate that sufficient tension has been applied and the operator should begin decreasing tension.

The GUI presented on the smart phone could perform additional functions, including:

1. Providing identifying information as to the intelligent cable module 202 and the calibration load cell 450 (serial numbers, descriptive identifying information, etc.);

2. Providing historical information as to the intelligent cable module (manufacturing date, date of present installation, date of last calibration, etc.);

3. Providing historical information as to the cable to which the intelligent cable module is presently attached; and 4. Sending the calibration results to a remote computing system.

This last step may be particularly important. The communication modules included in the intelligent cable module and the calibration load cell are short-range devices. Smartphone 508, however, has both short range and long range communication capability. It can receive the calibration data via BLUETOOTH and then re-transmit it to a remote server or cloud-base network via cellular or other long-range communication.

Figure 19:
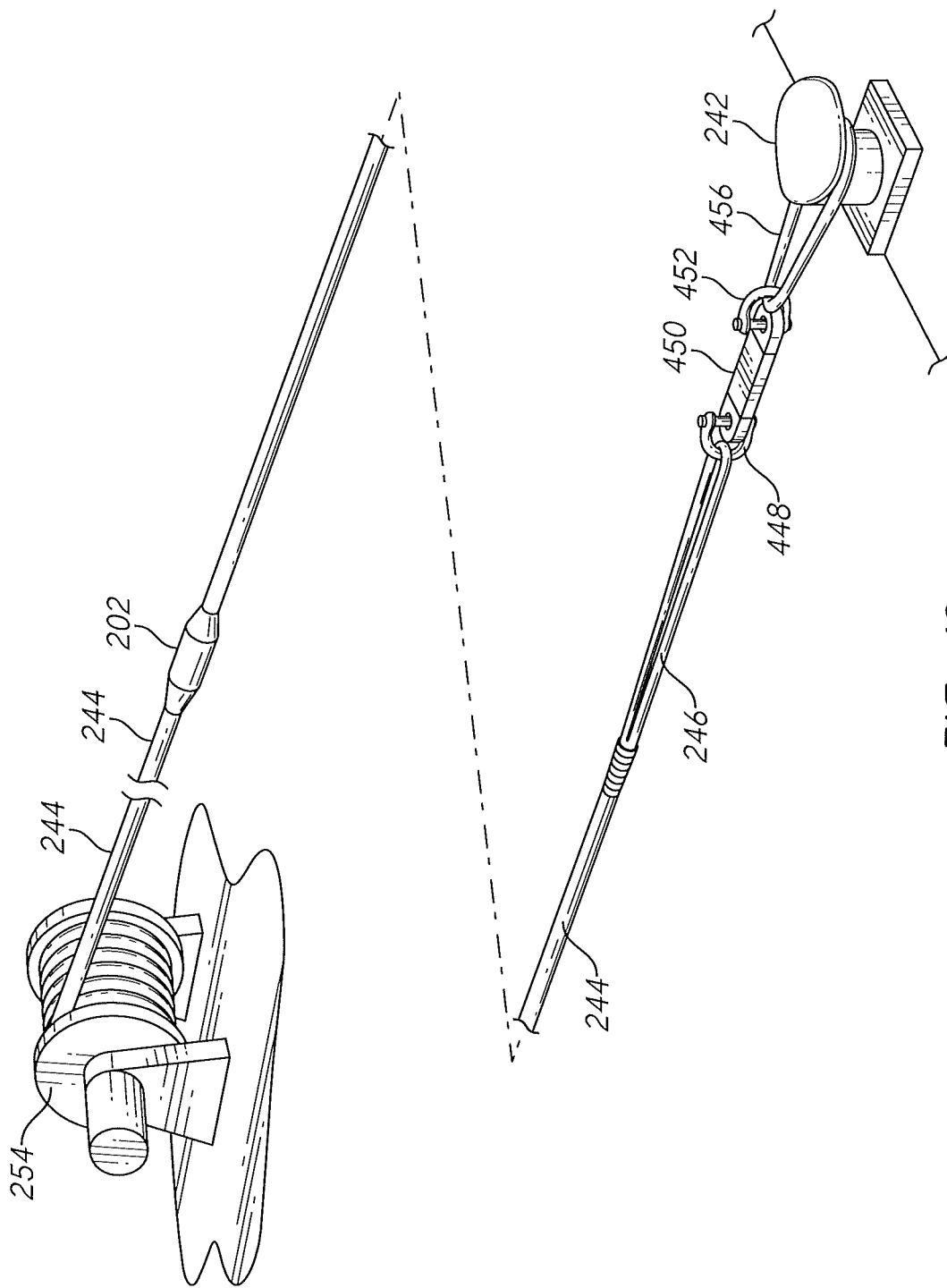
FIG. 19 is a perspective view, showing an exemplary arrangement used for calibration.

FIG. 18 depicts an exemplary rigging for the calibration process in use on a lifting crane. The calibration process will be carried out in many other settings. FIG. 19 shows a calibration process rig for a ship mooring line. The reader should bear in mind that a cable to be calibrated can be rigged in a wide variety of ways. The examples presented should be viewed as a few examples among a much wider range of possibilities.

In FIG. 19, the mooring line/rigging assembly is so long that the view is broken in order to show the significant portions at a sufficiently large scale. Winch 254 is actually on board the vessel. The vessel is at this point already urged laterally against one or more fenders along a quay. Mooring line 244 passes out through a hawser hole in the ship's structure. Intelligent cable module 202 in this example is installed on the mooring line in a position that rests outside the ship when the line is in use. Sling 246—on the far end of the mooring line 244—is ordinarily slipped over the top of bollard 242. However, in this calibration example, shackle 448 is used to attach sling 246 to calibration load cell 450. A second shackle 452 is used to attach the opposite end of the calibration load cell to sling 456. Sling 456 is then looped around bollard 242.

Once the calibration process is initiated, winch 254 is used to apply tension to the mooring line. Several tension cycles are applied while the calibration load cell communicates with the intelligent cable module as described previously. The process continues until a stabilized calibration curve is created and stored.

The rig shown in FIG. 19 is desirable since calibration/recalibration can be performed without removing the mooring line form the vessel. In other cases the operator may wish to remove the mooring line from the vessel and perform the calibration/recalibration in a rig such as shown in FIG. 17 (which might be quayside or might be located in some other facility).

Figure 23:
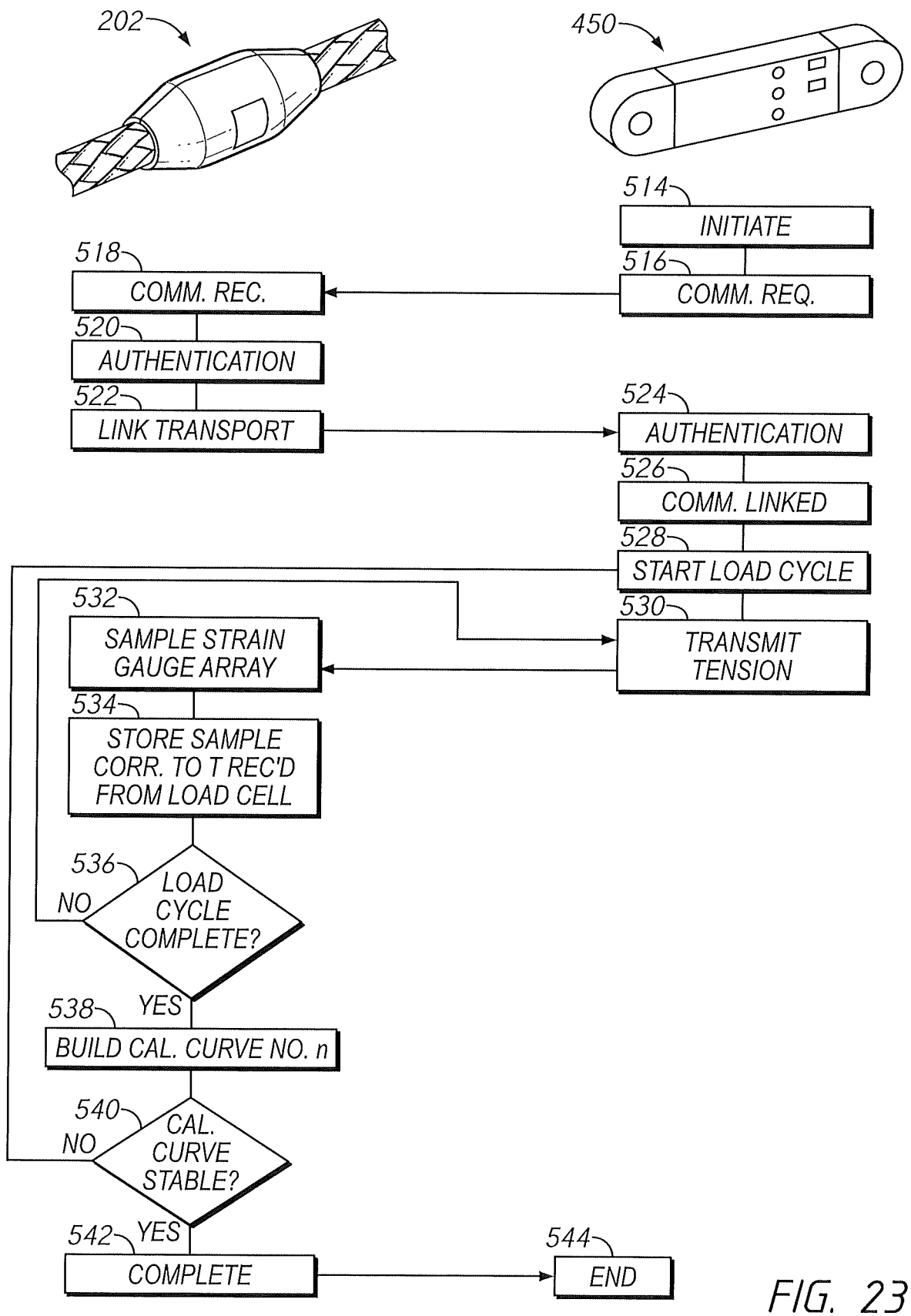
FIG. 23 is a flow chart depicting the calibration process

The inventive process can be carried out in a variety of ways. FIG. 23 illustrates one possible process flow. The actions of the intelligent cable module 202 are in the left hand column and the actions of the calibration load cell 450 are in the right hand column. The user will generally start the process by rigging calibration load cell 450 in a tension-applying arrangement such as shown in FIG. 17, 18, or 19. This will generally result in calibration load cell 450 being close enough to intelligent cable module 202 to permit wireless communications between the two (or the connection of a hardwired link).

The user starts the process by pressing a start button on the calibration load cell (or using an external device such as a smartphone to initiate the process using software). Initiation step 514 commences the process. Identifying information for the particular intelligent cable module 202 is provided to the cell 450. This is needed because the intelligent cable module 202 is operated in a non-discoverable mode. It will only respond if it receives proper identifying information. Calibration load cell 450 transmits this identifying information to the intelligent cable module in communication request step 516.

Intelligent cable module 202 receives the communication request in step 518 and authenticates the request in step 520. Assuming that the request is authenticated (by verifying the identifying information transmitted), the module 202 transmits a link request in step 522. The calibration load cell 450 receives this link request and authenticates it in step 524. Assuming the authentication is positive, a two-way communication link is established in step 526. This process ensures that only a properly authorized calibration load cell is able to communicate with the intelligent cable module 202. The authentication can be performed in many different ways, but will in general include the transmission of specific information between the calibration load cell and the intelligent cable module verifying that the communication is authorized. This information will generally be referred to as an "authentication key." In the context of BLUETOOTH communications, the authentication key can be a Bluetooth Device Address (a unique 48-bit identifier).

The actual calibration process begins at step 528 and runs in an iterative loop. Calibration load cell 450 starts the load cycle. Of course, the load cell cannot itself apply tension to the cable. Instead, it signals that the load should be applied by an external crane, winch, or other device (using the indicator lights on the load cell, a GUI on an external device, or some other method). In step 530, the calibration strain gauge transmits the current value for tension applied to the cable to the intelligent cable module 202. The processor in module 202 receives this information and—at or very near the same time—samples the reading from its internal instruments (such as a strain gauge array) in step 532. The sampling by the load cell 450 and the module 202 are preferably done in a time-synchronized fashion. The communication link can be used to establish this synchronization.

In step 534 the intelligent cable module's processor stores correlated data of its internal measurements against the external values for cable tension provided by calibration load cell 450. At step 536 the process asks whether the particular load cycle is complete. If the load cycle is not complete, then the process returns to step 530 and causes the calibration load cell to transmit a new current value for applied cable tension. The iterations continue until a determination is made at step 536 that the load cycle is complete.

In step 538 a new calibration curve is created using the correlated data stored in step 534. In step 540 the stability of the newly created calibration curve is tested. In this context "stability" means that the iterative process has converged on a calibration curve that is (1) no longer changing significantly with successive iterations, and (2) producing derived values for cable tension that accurately match the tension values being produced by the calibration load cell. A threshold can be defined for this purpose. As an example, the threshold might be defined as less than 1% variation at any point between the derived values for tension produced by the calibration curve and the values measured by the calibration load cell. Once stability of the calibration curve is achieved, the process proceeds to completion step 542. The new calibration curve is stored in memory in the intelligent cable module 202 and the process proceeds to end step 544. Indicator 512 on the calibration load cell is illuminated (and a separate indicate may be made on the GUI). The operator then knows it is safe to disassemble the calibration rig and remove the calibration load cell 450.

Authentication is important in this process. The calibration curve stored on module 202 cannot be altered unless a properly authenticated communication is received. The calibration load cell 450 is used for this purpose. In the preferred embodiments, the calibration load cell 450 must be present (within communication radio range or within the range of a physical hardwired connection) before the calibration curve can be opened and modified.

The language used in the preceding detailed descriptions pertains to BLUETOOTH ("non-discoverable mode," etc.) but the invention is not limited to any particular protocol. In general the process should have an authentication step that verifies that the communication between the intelligent cable module 202 and the calibration load cell 450 is an authorized communication. The authentication will assume different forms with different communication protocols.

Of course, the intelligent cable module will frequently communicate with external devices outside of the calibration process. It will be common to have the module 202 regularly transmit the values it determines for cable tension to an external device (such as a display in an operator's cab). These external devices may be allowed to freely link with the module 202. However, the authentication process will be required in order to access and potentially alter the calibration curve.

Figure 20:
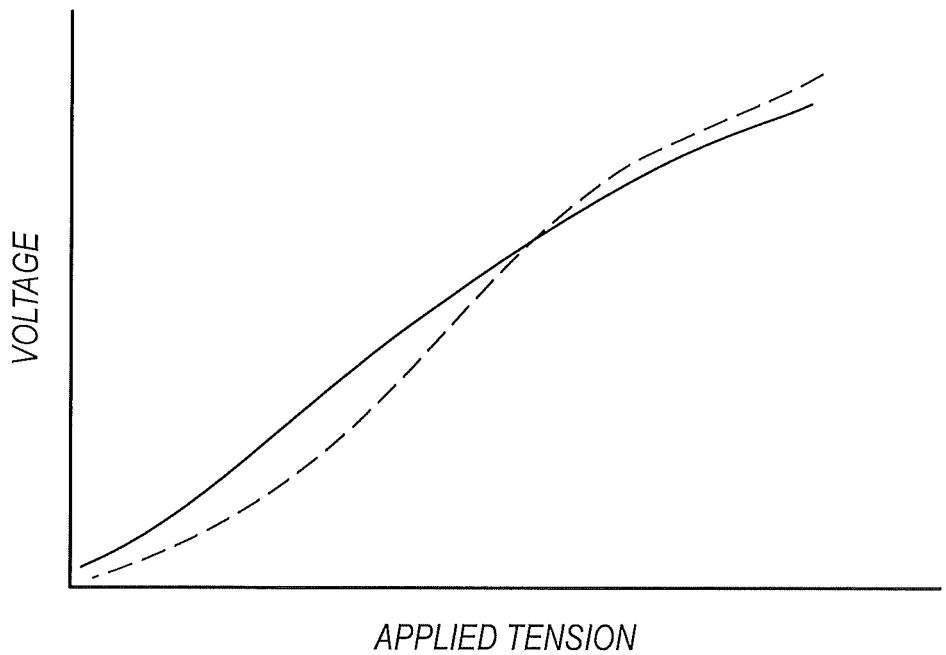
FIG. 20 is a plot of two calibration curves.
Figure 21:
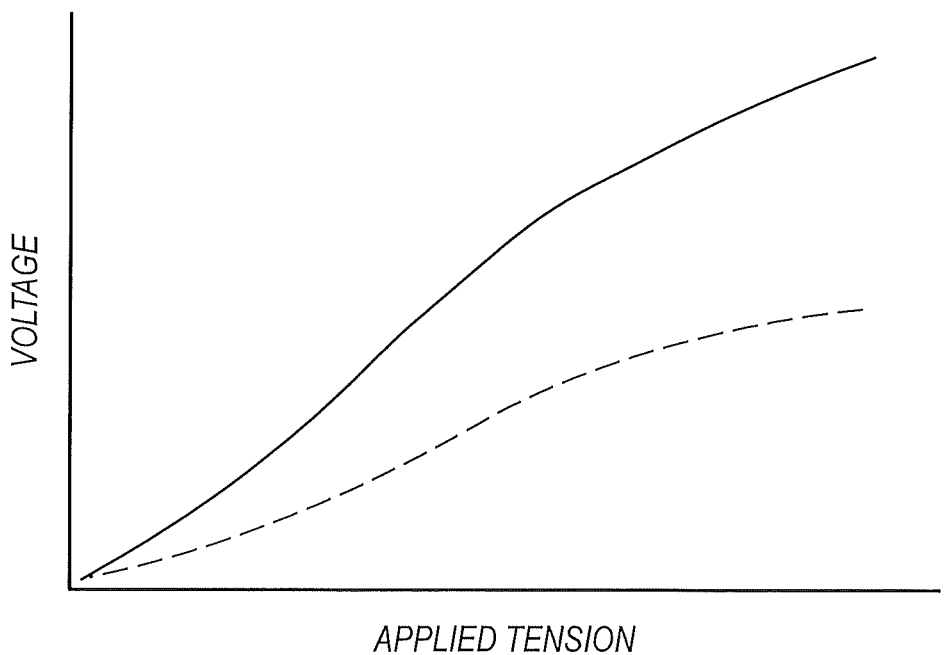
FIG. 21 is a plot of two calibration curves.

As explained previously, recalibration is desirable whenever an installation of an intelligent cable module is changed. FIGS. 20 and 21 illustrate the effect produced by changing an installation. In FIG. 20, a specific intelligent cable module has been removed from a first cable and installed on a second cable that is the same type as the first cable. The plot shows the existing calibration curve as a solid line (voltage read from the strain gauge array in the module (Vsg) versus applied tension). The dashed line shows the actual relationship between measured strain gauge voltage and applied tension for the new installation. Even though the new cable is constructed in the same way as the old one and uses the exact same materials, a calibration curve developed on one cable will not be reliably transferrable to a second cable. In this example recalibration should be performed.

FIG. 21 shows an example where an intelligent cable module has been removed from a first cable of a first type and installed on a second cable of a different type. The existing calibration curve is shown as a solid line. The dashed line once again shows the actual relationship between measured strain gauge voltage and applied tension for the new installation. The reader will observe that the existing calibration curve is quite inaccurate. Recalibration is again needed.

The invention can include safeguards to ensure that the calibration curve remains accurate. The embodiment of FIG. 4 provides a good example of one such safeguard. The reader will recall that for this type of intelligent cable module, the strain gauges that do the actual measuring are located within transverse tube 376 and that transverse tube 376 must be locked in place in order for the electrical contacts 380 to mate. The processor within instrumentation package 388 can be programmed to require recalibration if the contacts 380 are unmated for any significant period—indicating that someone has removed transverse tube 376 or at least altered its position. A warning signal is sent from the intelligent cable module informing the user that recalibration is needed.

It will not always be possible to quickly recalibrate the installation so a "limp" mode can be provided. In this mode the intelligent cable module transmits a message indicating that the calibration curve is now suspect and recommending operating only at a reduced load for a short interval until recalibration can be performed.

Tamper resistance is another concern in the present invention. The calibration curve is necessary for the intelligent cable module to send accurate information (such as real-time values for cable tension). If the module is altered by an unauthorized user, the information transmitted by the module may no longer be accurate. This can produce a very dangerous situation in which inaccurate module information is used to monitor loads in mining and other lifting operations. In general, the calibration curve stored on the intelligent cable module will be locked (incapable of change) unless an authenticated communication link is established between the intelligent cable module and a calibration load cell.

Figure 5:
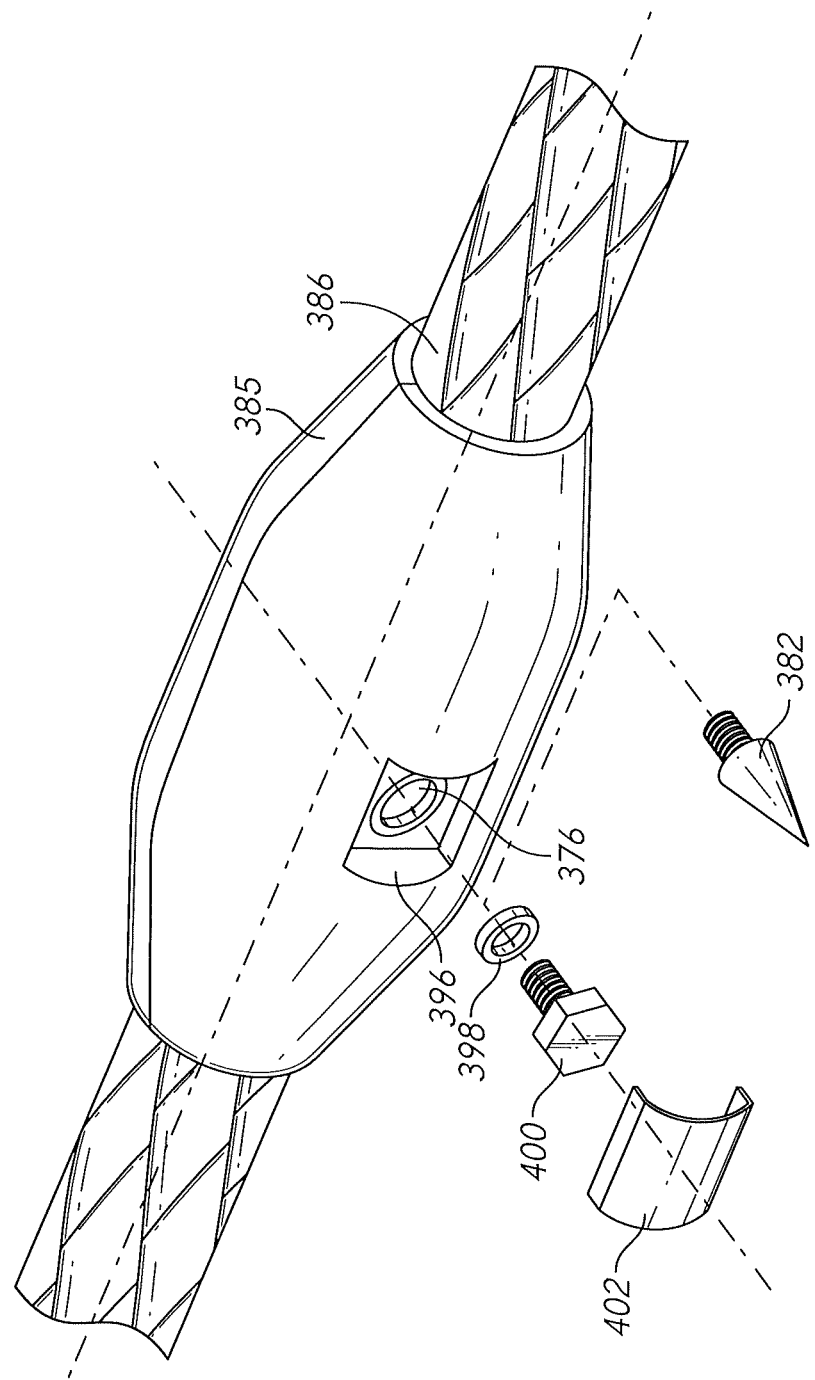
FIG. 5 is an exploded perspective view, showing the module of FIG. 8 from the opposite side.
Figure 6:
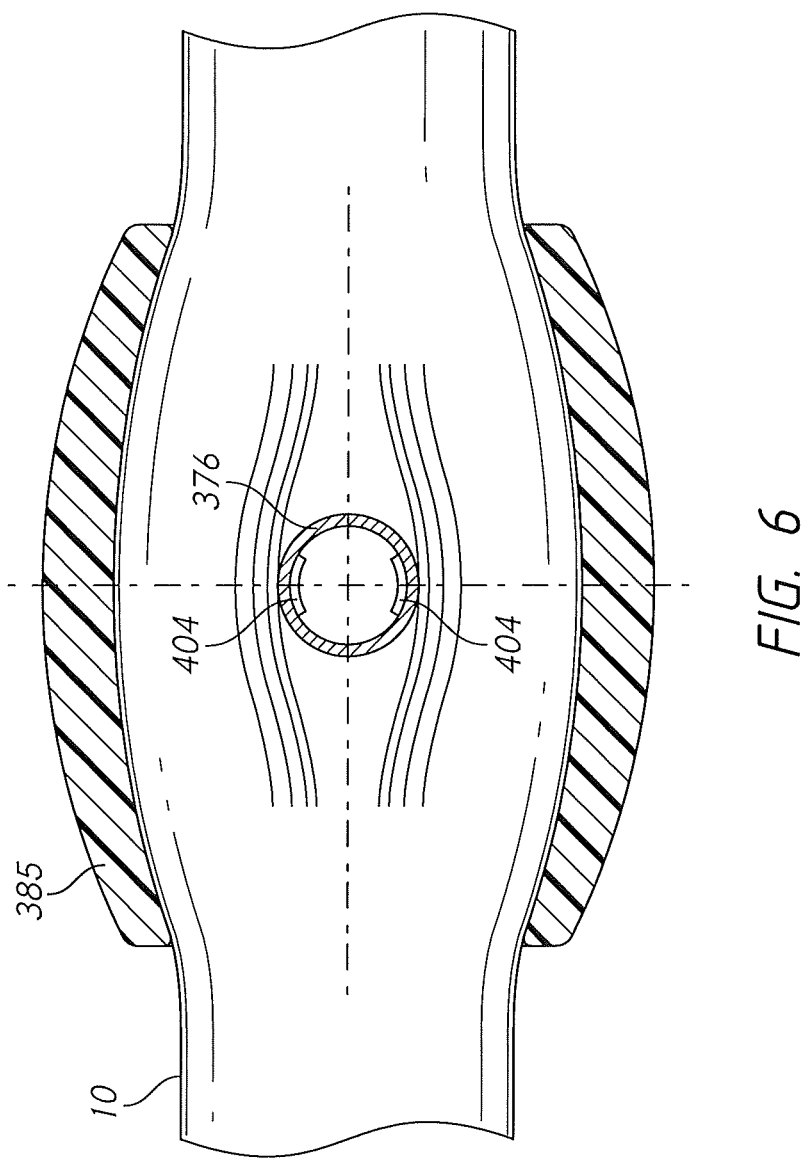
FIG. 6 is a sectional elevation view, showing the operation of the module of FIG. 4.
Figure 7:
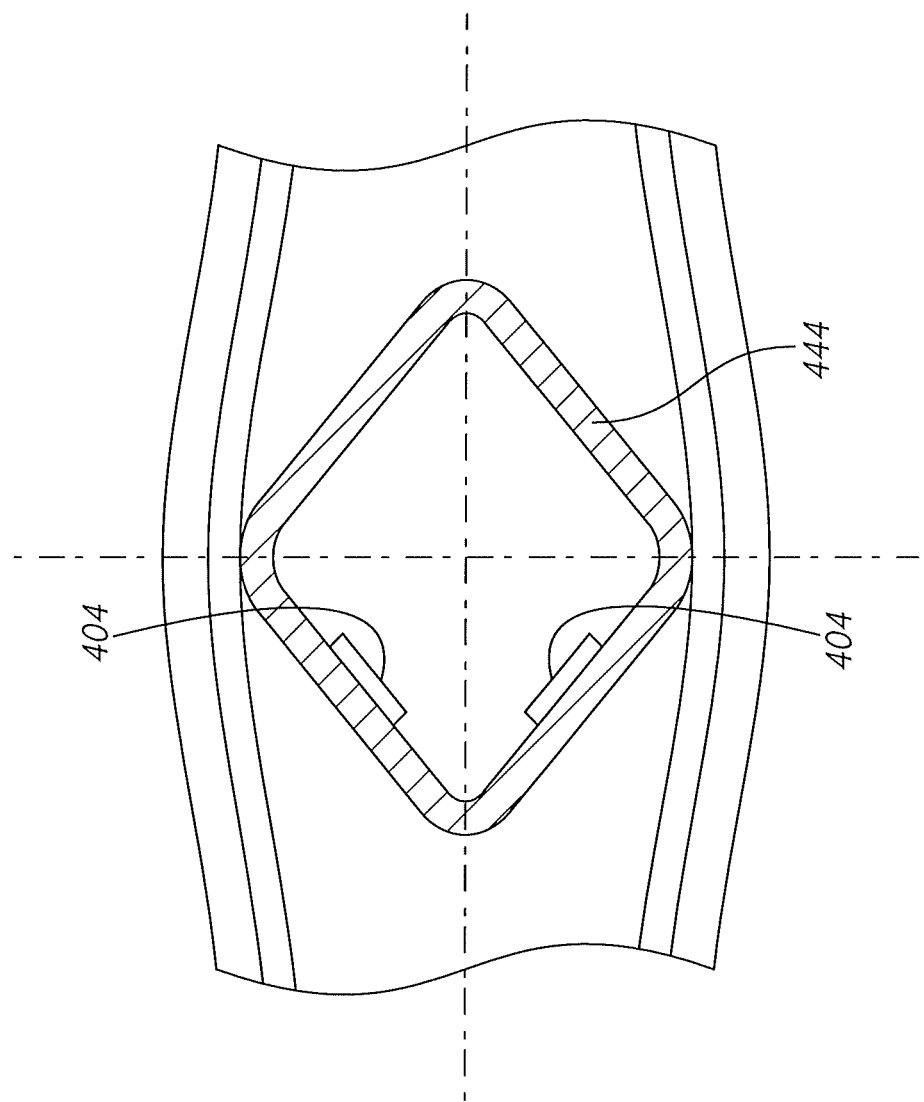
FIG. 7 is a sectional elevation view, showing an alternate embodiment of the module of FIG. 4.
Figure 8:
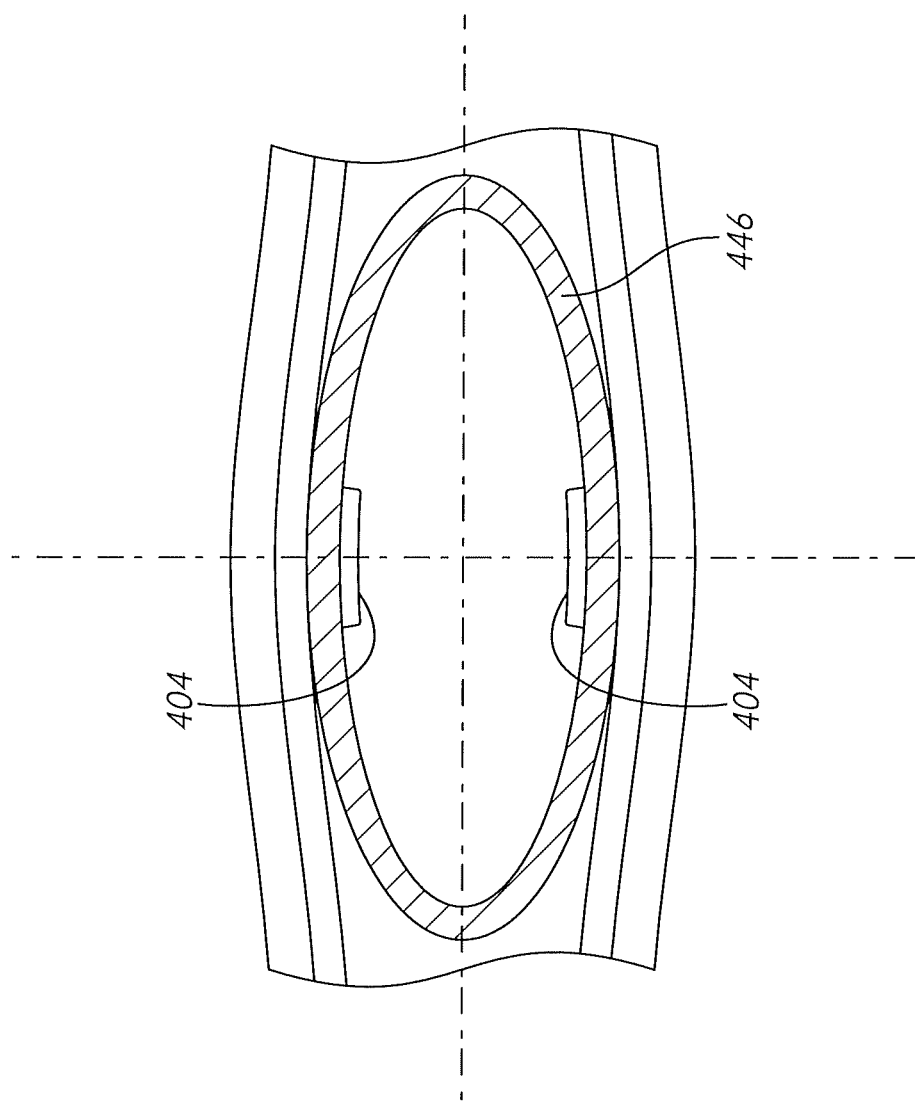
FIG. 8 is a sectional elevation view, showing an alternate embodiment of the module of FIG. 4.
Figure 9:
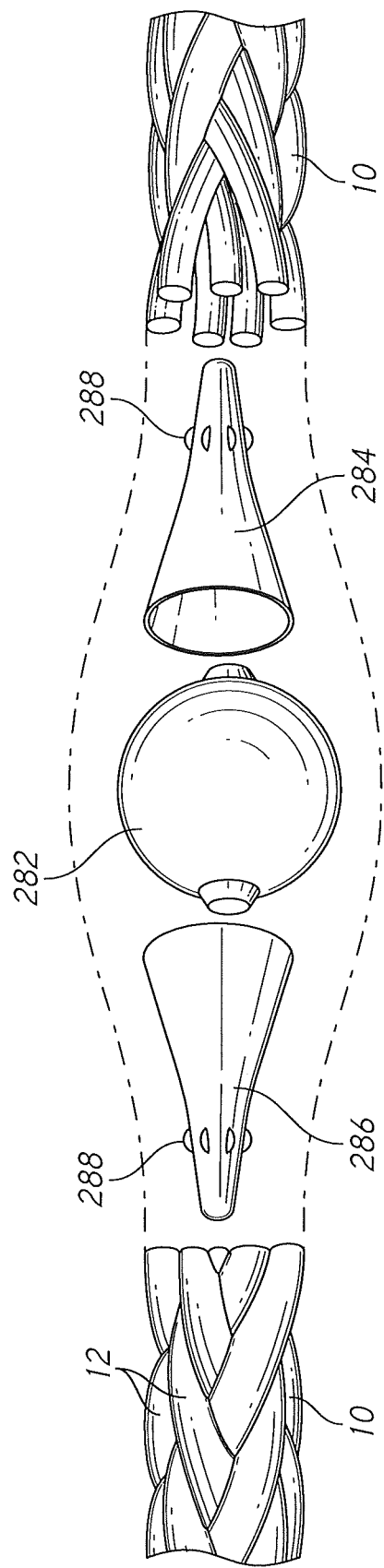
FIG. 9 is an exploded perspective view, showing another type of intelligent cable module.
Figure 10:
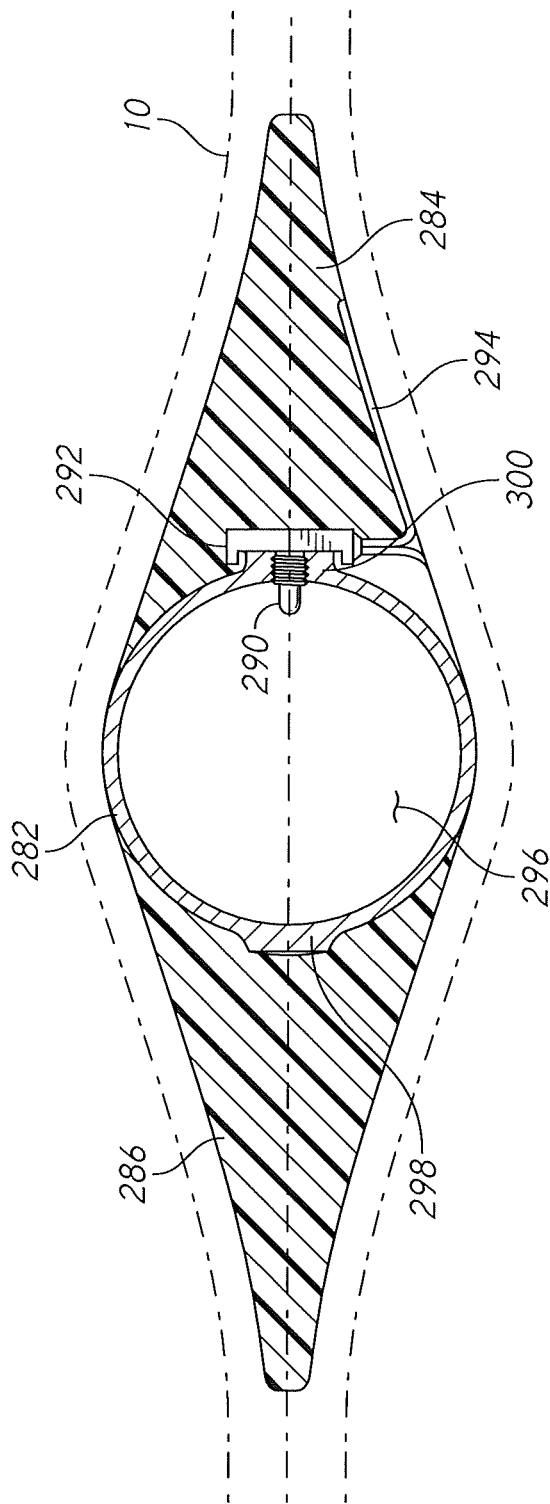
FIG. 10 is a sectional elevation view, showing the intelligent cable module of FIG. 9.
Figure 11:
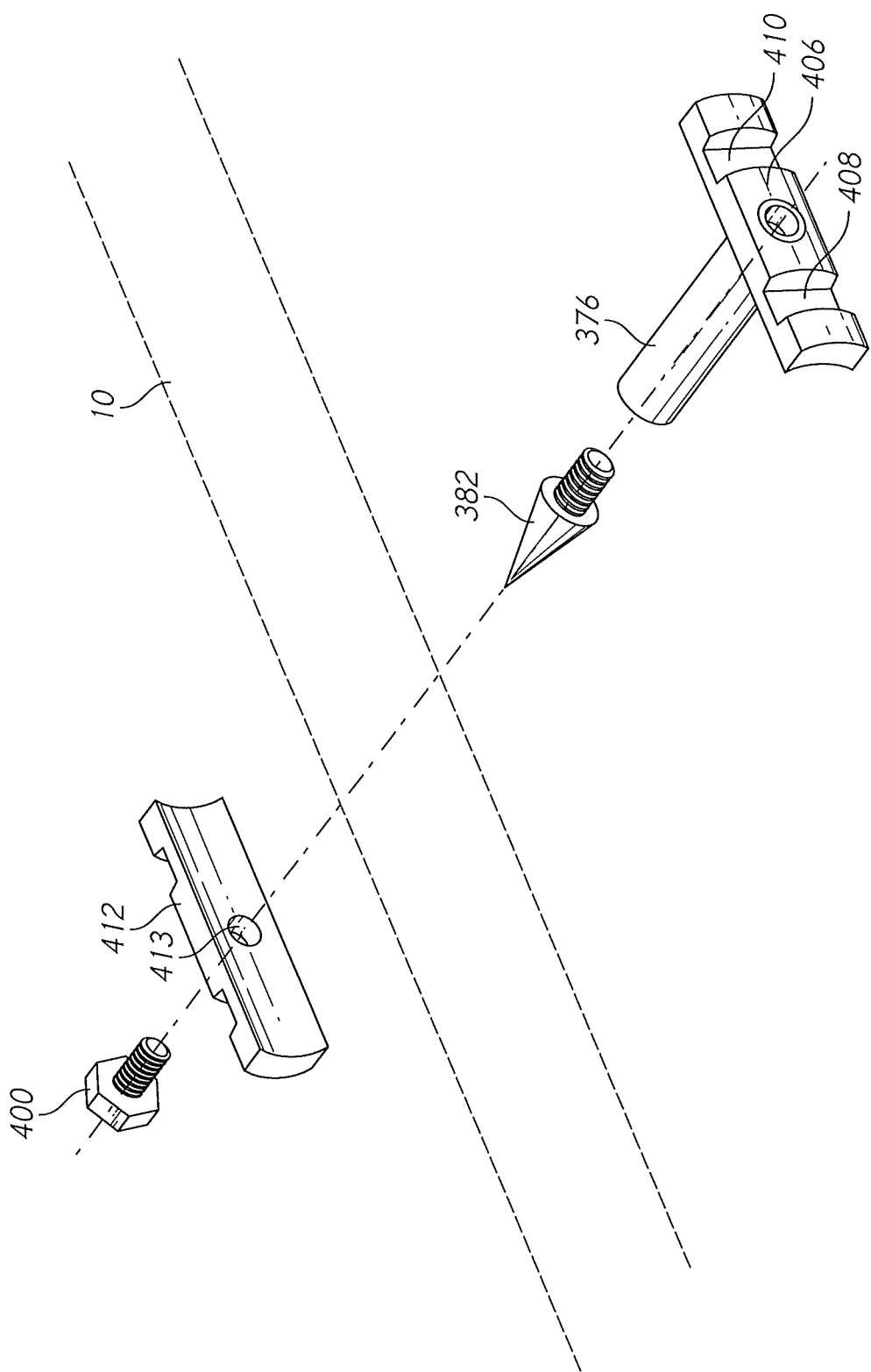
FIG. 11 is an exploded perspective view, showing another type of intelligent cable module.
Figure 12:
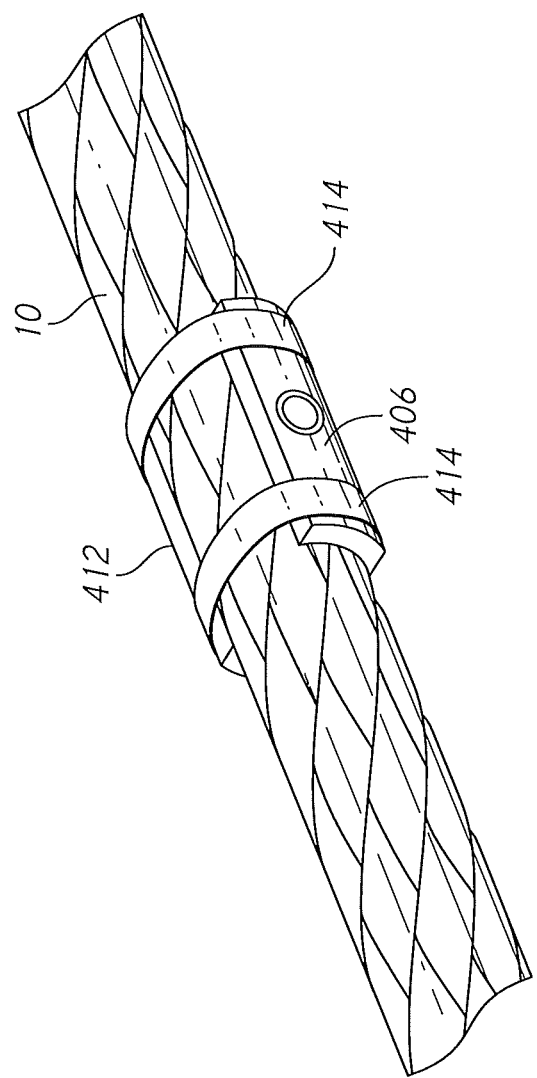
FIG. 12 is a perspective view, showing the module of FIG. 11 in an assembled state.
Figure 13:
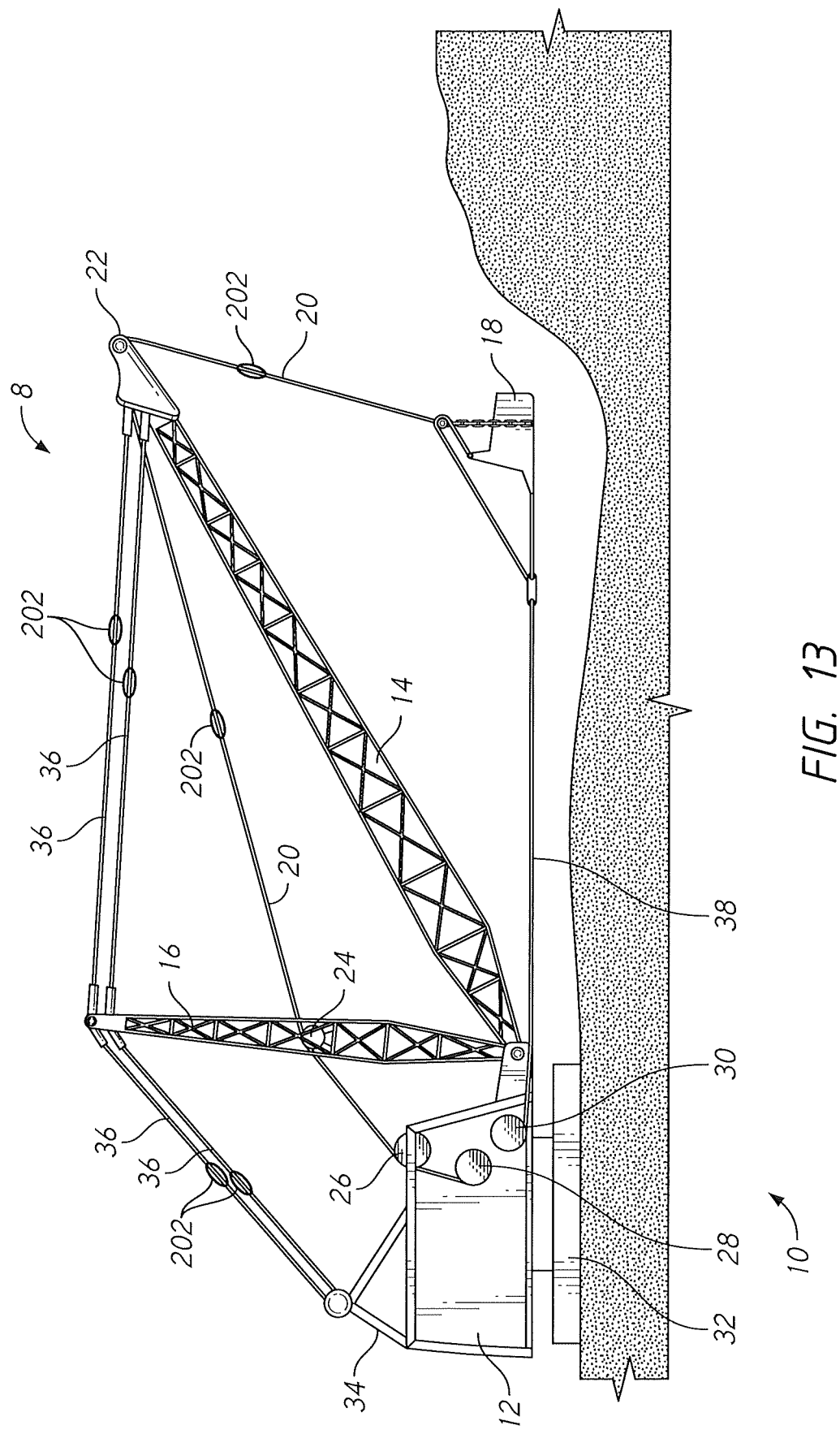
FIG. 13 is an elevation view, showing exemplary locations for intelligent cable modules in a dragline crane.
Figure 14:
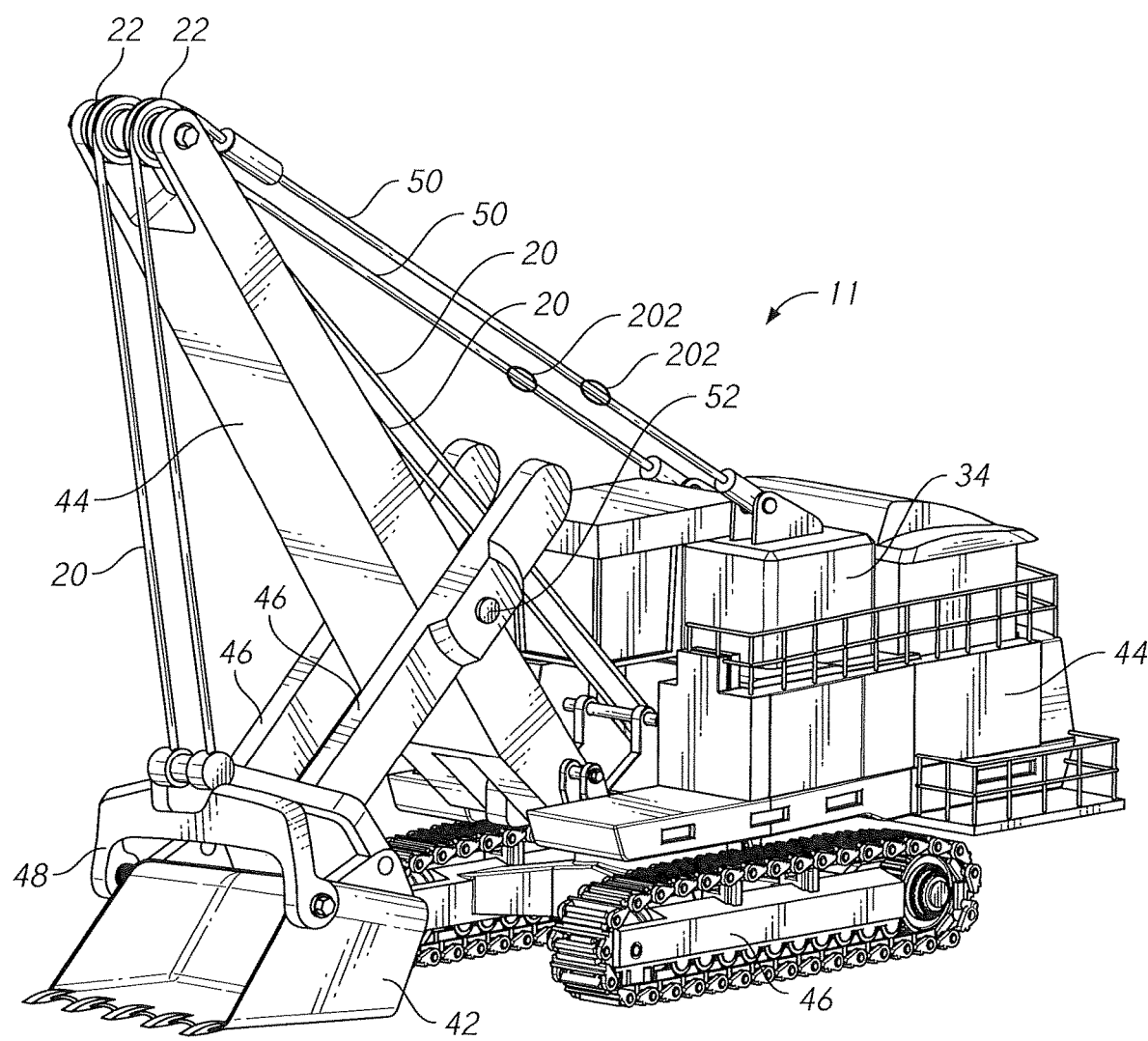
FIG. 14 is a perspective view, showing exemplary locations for intelligent cable modules in a power shovel.
Figure 15:
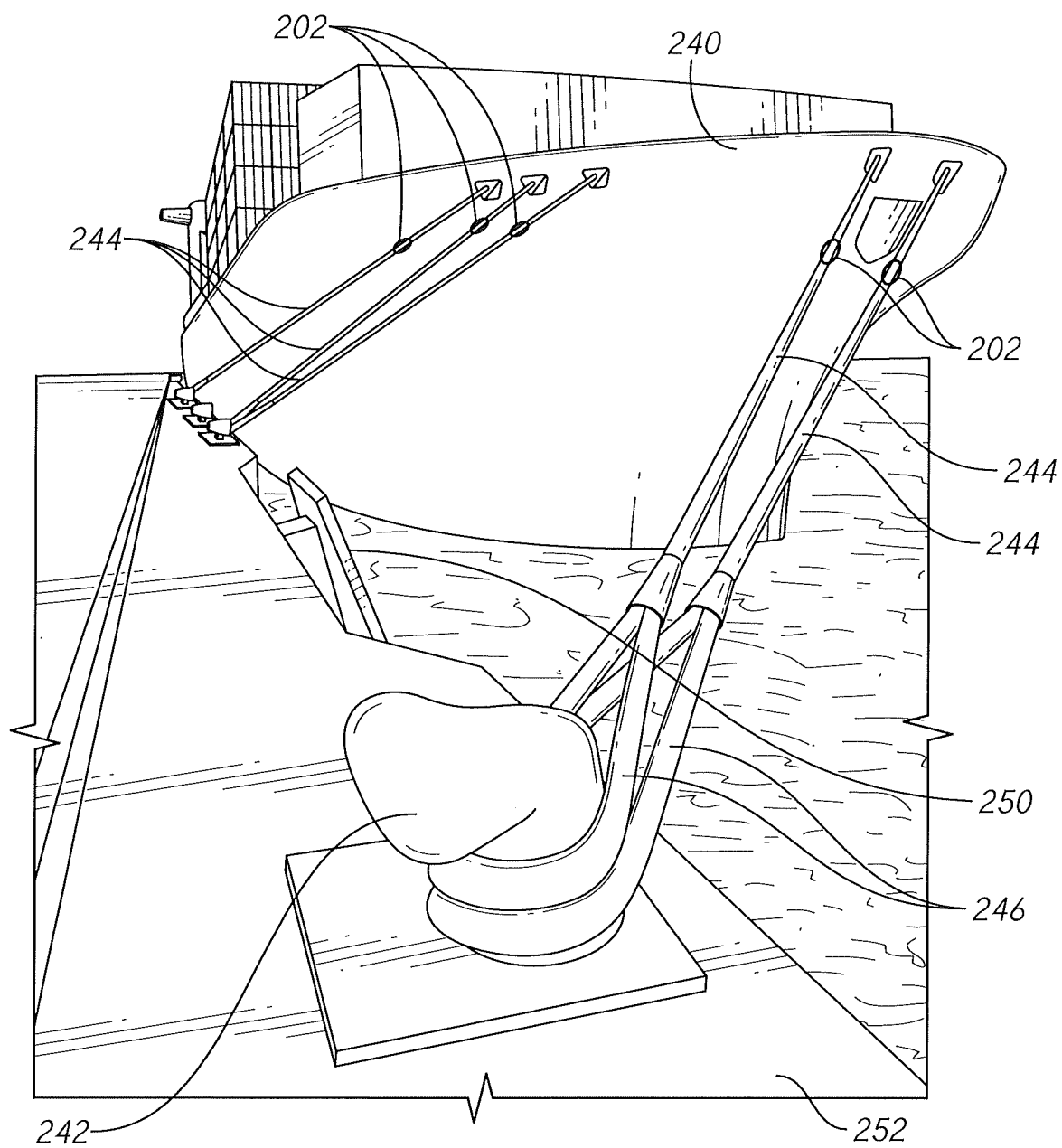
FIG. 15 is a perspective view, showing exemplary location for intelligent cable modules in vessel mooring lines.

Tamper resistance is preferably built into the physical structures and the software. Returning to the intelligent cable module 202 depicted in FIGS. 4 and 5, one can provide a frangible seal for the head of bolt 400, so that it can only be removed with a specialized tool. A foil seal can also be provided over the top of orientation cap 378—with the foil seal providing a clear indication if the cap has been removed.

The software tamper resistance can assume several forms. Looking at the example of FIG. 4, the software can be set to simply erase the on-board calibration curve if communication through electrical contacts 380 is interrupted. This would then place the system in "limp" mode. In limp mode the module would still communicate but would provide no tension data—indicating instead that recalibration is necessary. In still another embodiment, all memory on board the intelligent cable module is wiped clean in response to an unauthorized assembly of the device or a specified number of wireless communications attempted without the proper authentication information.

Many other features can be added and combined with those described. Additional examples include the following:

1. The intelligent cable module can include an interim provisional verification process where a crane is used to lift a load of a known weight. The known weight is entered using the GUI on a smartphone. The module 202 will then transit the determined value for cable tension when the known weight is lifted and this can be used to provisionally verify that the calibration curve in place remains accurate.

2. Process control for an organization can be implemented using the calibration load cell 450. It must be signed out using a chain of custody authentication and returned. In this way an organization can ensure that only properly trained persons are performing the calibration process.

3. The calibration load cell 450 can be used as part of a closed-loop system where it provides tension requests to an external device (such as a winch controller) for applying a specific tension curve.

4. Power for the intelligent cable modules and the calibration load cells can be provided by an internal battery, by and external jack, or some combination. Power for the intelligent cable modules can be provided by on-board solar cells as well.

5. The need for recalibration can be triggered by monitoring many parameters, including the number of load cycles where tension exceeded a threshold, a single instance of a tension exceedance, elapsed time since the last calibration, etc.

6. The calibration curve can be created by an external computing device (separate form the calibration load cell and the intelligent cable module) and then loaded onto the intelligent cable module. The external computing device could receive tension data from the calibration load cell and raw data from the intelligent cable module. The external computing device could then use this raw data to create a calibration curve that is loaded onto the intelligent cable module.

7. The authentication key will generally be sent from the calibration load cell to the intelligent cable module, but the authentication key may also be sent from the intelligent cable module to the calibration load cell. An authentication scheme can be designed to operate in either direction and still carry out the present invention.

8. The intelligent cable module can include rotation and angular position sensing in order to determine how many rotations a cable has undergone and a present angular displacement for a particular position on the cable. This information is significant as rotation of many cable types affects the strand-o-strand distribution of the total load.

Although the preceding description contains significant detail, it should not be construed as limiting the scope of the invention but rather as providing illustrations of the preferred embodiments of the invention. As an example, any of the embodiments described for use on a full cable can be adapted for use on a single strand of a larger cable, and vice-versa. Those skilled in the art will be able to devise many other embodiments that carry out the present invention. Thus, the language used in the claims shall define the invention rather than the specific embodiments provided.

Having described our invention, we claim:

1. A method for calibrating an intelligent cable module attached to a tensile strength member, comprising:
    (a) providing said intelligent cable module, including,
        (i) a tension proxy measurement device,
        (ii) a first communication module;
    (b) providing a calibration load cell, including,
        (i) a tension measuring device,
        (ii) a second communication module;
    (c) rigging said calibration load cell in series with said tensile strength member so that a tension placed on said tensile strength member passes through said calibration load cell;
    (d) establishing an authenticated communication link between said intelligent cable module and said calibration load cell using said first and second communications modules;
    (e) applying a load cycle to said tensile strength member;
    (f) during said load cycle collecting a first set of measurements from said tension proxy measurement device in said intelligent cable module and a second set of measurements from said tension measuring device in said calibration load cell; and
    (g) using said first set of measurements and said second set of measurements to create a calibration curve that is then stored in said intelligent cable module.

2. A method for calibrating an intelligent cable module attached to a tensile strength member as recited in claim 1, wherein said authenticated communication link is established by said calibration load cell transmitting an authentication key to said intelligent cable module.

3. A method for calibrating an intelligent cable module attached to a tensile strength member as recited in claim 1, wherein said first set of measurements and said second set of measurements are synchronized in time.

4. A method for calibrating an intelligent cable module attached to a tensile strength member as recited in claim 1, further comprising after said calibration curve has been created maintaining said calibration curve in a locked condition unless said authenticated communication link is active.

5. A method for calibrating an intelligent cable module attached to a tensile strength member as recited in claim 1, wherein said load cycle, collecting said first and second sets of measurements, and creating said calibration curve is an iterative process.

6. A method for calibrating an intelligent cable module attached to a tensile strength member as recited in claim 5, wherein said iterative process continues until said calibration curve produces determined values for tension on said tensile strength member that fall within a defined variance of values for tension on said tensile strength member measured by said calibration load cell.

7. A method for calibrating an intelligent cable module attached to a tensile strength member as recited in claim 1, wherein said authenticated communication link is a wireless link.

8. A method for calibrating an intelligent cable module attached to a tensile strength member, said intelligent cable module including a tension proxy measurement device and a first communication module, comprising:
    (a) providing a calibration load cell, including,
        (i) a tension measuring device,
        (ii) a second communication module;
    (b) rigging said calibration load cell in series with said tensile strength member so that a tension placed on said tensile strength member passes through said calibration load cell;
    (c) establishing an authenticated communication link between said intelligent cable module and said calibration load cell using said first and second communications modules;
    (d) applying a load cycle to said tensile strength member;
    (e) during said load cycle collecting a first set of measurements from said tension proxy measurement device in said intelligent cable module and a second set of measurements from said tension measuring device in said calibration load cell; and
    (g) using said first set of measurements and said second set of measurements to create a calibration curve that is then stored in said intelligent cable module.

9. A method for calibrating an intelligent cable module attached to a tensile strength member as recited in claim 8, wherein said authenticated communication link is established by said calibration load cell transmitting an authentication key to said intelligent cable module.

10. A method for calibrating an intelligent cable module attached to a tensile strength member as recited in claim 8, wherein said first set of measurements and said second set of measurements are synchronized in time.

11. A method for calibrating an intelligent cable module attached to a tensile strength member as recited in claim 8, further comprising after said calibration curve has been created maintaining said calibration curve in a locked condition unless said authenticated communication link is active.

12. A method for calibrating an intelligent cable module attached to a tensile strength member as recited in claim 8, wherein said load cycle, collecting said first and second sets of measurements, and creating said calibration curve is an iterative process.

13. A method for calibrating an intelligent cable module attached to a tensile strength member as recited in claim 12, wherein said iterative process continues until said calibration curve produces determined values for tension on said tensile strength member that fall within a defined variance of values for tension on said tensile strength member measured by said calibration load cell.

14. A method for calibrating an intelligent cable module attached to a tensile strength member as recited in claim 8, wherein said authenticated communication link is a wireless link.

15. A method for calibrating an intelligent cable module attached to a tensile strength member, said intelligent cable module including a tension proxy measurement device and a first communication module, comprising:
   (a) providing a calibration load cell configured to measure tension, said calibration load cell including a second communication module;
   (b) attaching said calibration load cell to said tensile strength member so that a tension placed on said tensile strength member passes through said calibration load cell;
   (c) communicating an authentication key between said intelligent cable module and said calibration load cell, thereby establishing an authenticated communication link between said calibration load cell and said intelligent cable module;
   (d) applying a load cycle to said tensile strength member;
   (e) during said load cycle collecting a first set of measurements from said tension proxy measurement device in said intelligent cable module and a second set of measurements from said tension measuring device in said calibration load cell; and
   (g) using said first set of measurements and said second set of measurements to create a calibration curve that is then stored in said intelligent cable module.

16. A method for calibrating an intelligent cable module attached to a tensile strength member as recited in claim 15, wherein said authentication key is transmitted from said second communication module to said first communication module.

17. A method for calibrating an intelligent cable module attached to a tensile strength member as recited in claim 15, wherein said first set of measurements and said second set of measurements are synchronized in time.

18. A method for calibrating an intelligent cable module attached to a tensile strength member as recited in claim 15, further comprising after said calibration curve has been created maintaining said calibration curve in a locked condition unless said authenticated communication link is active.

19. A method for calibrating an intelligent cable module attached to a tensile strength member as recited in claim 15, wherein said load cycle, collecting said first and second sets of measurements, and creating said calibration curve is an iterative process.

20. A method for calibrating an intelligent cable module attached to a tensile strength member as recited in claim 19, wherein said iterative process continues until said calibration curve produces determined values for tension on said tensile strength member that fall within a defined variance of values for tension on said tensile strength member measured by said calibration load cell.

* * * * *